US010419430B2

(12) United States Patent
Morikawa et al.

(10) Patent No.: US 10,419,430 B2
(45) Date of Patent: Sep. 17, 2019

(54) MUTUAL AUTHENTICATION METHOD AND AUTHENTICATION APPARATUS

(71) Applicant: FUJITSU LIMITED, Kawasaki-shi, Kanagawa (JP)

(72) Inventors: Ikuya Morikawa, Kawasaki (JP); Yumi Sakemi, Kawasaki (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 244 days.

(21) Appl. No.: 15/405,830

(22) Filed: Jan. 13, 2017

(65) Prior Publication Data
US 2017/0208062 A1 Jul. 20, 2017

(30) Foreign Application Priority Data
Jan. 15, 2016 (JP) .................. 2016-005919

(51) Int. Cl.
*H04L 29/06* (2006.01)
*H04L 9/08* (2006.01)
(Continued)

(52) U.S. Cl.
CPC ........ *H04L 63/0869* (2013.01); *H04L 9/0841* (2013.01); *H04L 9/0844* (2013.01);
(Continued)

(58) Field of Classification Search
CPC ................................................ H04L 63/0869
(Continued)

(56) References Cited

U.S. PATENT DOCUMENTS

2007/0286373 A1* 12/2007 Pailles ............... H04L 29/06
379/142.03
2009/0100264 A1* 4/2009 Futa ............... H04L 9/0844
713/170
(Continued)

FOREIGN PATENT DOCUMENTS

EP 2228942 A1 9/2010
JP 2010-004288 1/2010
JP 2015-126485 A 7/2015

OTHER PUBLICATIONS

Ozawa, Hiroshi et al., "Identity based SSL/TLS and its OpenSSL Implementation," SCIS 2009, The 2009 Symposium on Cryptography and Information Security, Otsu, Japan, Jan. 20-23, 2009, The Institute of Electronics, Information and Communication Engineers, pp. 1-6, with English Abstract.
(Continued)

*Primary Examiner* — Longbit Chai
(74) *Attorney, Agent, or Firm* — Fujitsu Patent Center

(57) ABSTRACT

A first device generates first encrypted data from a second public key corresponding to second ID regarding a second device and a first random number and transmits first ID regarding the first device, second ID, and first encrypted data. The second device generates second encrypted data from a first public key corresponding to the first ID and a second random number, generates second verification data by generating a second shared-key candidate from the second random number, the first encrypted data, and a second private key, and transmits the second encrypted data and second verification data. The first device generates first verification data by generating a first shared-key candidate from the first random number, the second encrypted data, and a first private key and transmits the first verification data. The first and second devices examine the second and
(Continued)

first verification data by using the first and second shared-key candidates, respectively.

4 Claims, 13 Drawing Sheets

(51) Int. Cl.
| | |
|---|---|
| *H04L 9/14* | (2006.01) |
| *H04L 9/30* | (2006.01) |
| *H04W 12/04* | (2009.01) |
| *H04W 12/06* | (2009.01) |

(52) U.S. Cl.
CPC .......... *H04L 9/0847* (2013.01); *H04L 9/0877* (2013.01); *H04L 9/14* (2013.01); *H04L 9/30* (2013.01); *H04L 63/0428* (2013.01); *H04L 63/06* (2013.01); *H04L 63/061* (2013.01); *H04W 12/04* (2013.01); *H04W 12/06* (2013.01); *H04L 9/3073* (2013.01)

(58) Field of Classification Search
USPC ....................................................... 713/171
See application file for complete search history.

(56) References Cited

U.S. PATENT DOCUMENTS

| | | | |
|---|---|---|---|
| 2011/0055567 A1* | 3/2011 | Sundaram ............. | H04L 9/0825 713/169 |
| 2015/0188704 A1 | 7/2015 | Takenaka et al. | |
| 2017/0208062 A1* | 7/2017 | Morikawa ............. | H04L 9/0841 |

OTHER PUBLICATIONS

Sakemi, Yumi et al., "A Mutual Authentication Scheme by using ID-based Encryption for IoT," SCIS 2015, The 32nd Symposium on Cryptography and Information Security, Kokura, Japan, Jan. 20-23, 2015, The Institute of Electronics, Information and Communication Engineers, pp. 1-8, with English Abstract.

Wang, Xiao-fen et al., "Improvement of McCullagh-Barreto key agreement with KCI-security," The Journal of China Universities of Posts and Telecommunications, Apr. 2009, vol. 16, Issue. 2, pp. 68-71.

Extended European Search Report dated Jun. 13, 2017 for corresponding European Patent Application No. 16204705.4, 7 pages.

Noel McCullagh et al., "A New Two-Party Identity-Based Authenticated Key Agreement", In Proceedings of the 2005 International Conference on Topics in Cryptology (2005), pp. 262-274 (15 pages).

Dan Boneh et al., "Identity-Based Encryption from the Weil Pairing", In Proceedings of the 21st Annual International Cryptology Conference on Advances in Cryptology (CRYPTO 2001), pp. 213-229 (28 pages).

Guohong Xie, "Cryptanalysis of Noel McCullagh and Paulo S. L. M. Barreto's two-party identity-based key agreement" IACR ePrint Archive: Report 2004/308, last revised Mar. 13, 2015, (8 pages).

Songping Li et al., "Towards Security Two-part Authenticated Key Agreement Protocols", IACR ePprint Archive: Report 2005/300, last revised Sep. 7, 2005, pp. 1-13 (14 pages).

M. Huang, "Identity-Based Encryption (IBE) Cipher Suites for Transport Layer Security (TLS)", Internet-Draft, draft-huang-tls-ibe-00, Jul. 3, 2009, pp. 1-16 (16 pages).

T. Dierks et al., "The TLS Protocol Version 1.0", IETF Request for Comments (RFC) 2246, pp. 1-80 (80 pages), Jan. 1999.

European Office Action dated Jun. 6, 2019 for corresponding European Patent Application No. 16204705.4, 6 pages. *Please note US-2011/055567-A1 and EP-2228942-A1 cited herewith, were previously cited on Dec. 21, 2018 and Jul. 11, 2017, respectively.*.

Japanese Office Action dated Jul. 23, 2019 for corresponding Japanese Patent Application No. 2016-005919, with English Translation, 8 pages.

* cited by examiner

MUTUAL AUTHENTICATION METHOD AND AUTHENTICATION APPARATUS

CROSS-REFERENCE TO RELATED APPLICATION

This application is based upon and claims the benefit of priority of the prior Japanese Patent Application No. 2016-005919, filed on Jan. 15, 2016, the entire contents of which are incorporated herein by reference.

FIELD

The embodiments discussed herein relate to a mutual authentication method and an authentication apparatus.

BACKGROUND

When a plurality of information processing devices perform data communication with each other via a network, various security risks exist. For example, data could be stolen or falsified by a third party on a communication path or a third party could fraudulently log on by using an unauthorized information processing device. Against this background, to ensure security, cryptographic communication technology can be used. Examples of the cryptographic communication technology include Secure Sockets Layer (SSL) and Transport Layer Security (TLS). SSL and TLS can be used in various types of data communication such as World Wide Web (WWW) communication, transmission of electronic mail, and Virtual Private Network (VPN) communication.

In cryptographic communication technology, there are cases in which handshakes are performed by using public key cryptography technology. For example, when two information processing devices perform a handshake, each of the two information processing devices that wish to perform data communication encrypts a key material such as a random number by using a public key of its communication peer and transmits the encrypted key material. The key material encrypted by using the public key can be decrypted only by an authorized information processing device having a private key that corresponds to the public key. Thus, when each of the two information processing devices determines that its communication peer has properly recognized the corresponding encrypted key material, each of the two information processing devices can validate its communication peer.

In addition, for example, when a handshake is performed, two information processing devices can independently generate a shared key on the basis of a predetermined key generation algorithm and a key material exchanged between the two information processing devices. If the two information processing devices are authorized information processing devices, the two information processing devices generate the same shared key. Thus, the two information processing devices can agree on the shared key, without transmitting the shared key itself. Thereafter, the two information processing devices can encrypt and transmit data on the basis of the agreed shared key.

Identity-based (ID-based) cryptography has been proposed as a kind of public key cryptography technology. In ID-based cryptography, instead of using a mathematically-generated numerical value as a public key, any identifier that can be recognized by humans such as a network address, a host name, or a device number or a numerical value obtained by converting such an identifier is used as a public key. In ID-based cryptography, cryptographic processing can be performed when an identifier of a communication peer is known, and there are cases in which a certificate that certifies that a public key is assigned to the communication peer is not needed.

See, for example, Japanese Laid-open Patent Publication No. 2010-4288.

In cryptographic communication technology, for example, two information processing devices can perform a handshake in accordance with the following procedure. One information processing device accesses the other information processing device. The latter information processing device transmits a key material obtained by performing encryption by using a public key of the former information processing device. The former information processing device transmits a key material obtained by performing encryption by using a public key of the latter information processing device. In addition, the former information processing device generates verification data for determining whether a shared key has accurately been generated from the key material and transmits the verification data. The latter information processing device also generates and transmits verification data. When each of the two information processing devices verifies its corresponding verification data, the two information processing devices determine that the shared key has been agreed upon.

However, in accordance with the above handshake procedure, four communications are performed between the two information processing devices. If the number of communications can be reduced, the authentication time can be shortened, and the overhead before the start of data communication can be reduced.

SUMMARY

According to one aspect, there is provided a mutual authentication method executed by a first information processing apparatus and a second information processing apparatus, the mutual authentication method including: generating, by the first information processing apparatus, first encrypted data by encrypting a first random number by using a second public key that corresponds to second identification information regarding the second information processing apparatus; transmitting, by the first information processing apparatus, first identification information regarding the first information processing apparatus, the second identification information, and the first encrypted data to the second information processing apparatus; generating, by the second information processing apparatus, second encrypted data by encrypting a second random number by using a first public key that corresponds to the first identification information; generating, by the second information processing apparatus, a second shared-key candidate, based on the second random number, the first encrypted data, and a second private key that corresponds to the second public key; generating, by the second information processing apparatus, second verification data by using the second shared-key candidate; transmitting, by the second information processing apparatus, the second encrypted data and the second verification data to the first information processing apparatus; generating, by the first information processing apparatus, a first shared-key candidate, based on the first random number, the second encrypted data, a first private key that corresponds to the first public key; generating, by the first information processing apparatus, first verification data by using the first shared-key candidate; examining, by the first information processing apparatus, the second verification data by using the first shared-key candidate; transmitting, by the first information processing apparatus, the first verification data to the second information processing apparatus; and examining, by the second information processing apparatus, the first verification data by using the second shared-key candidate.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
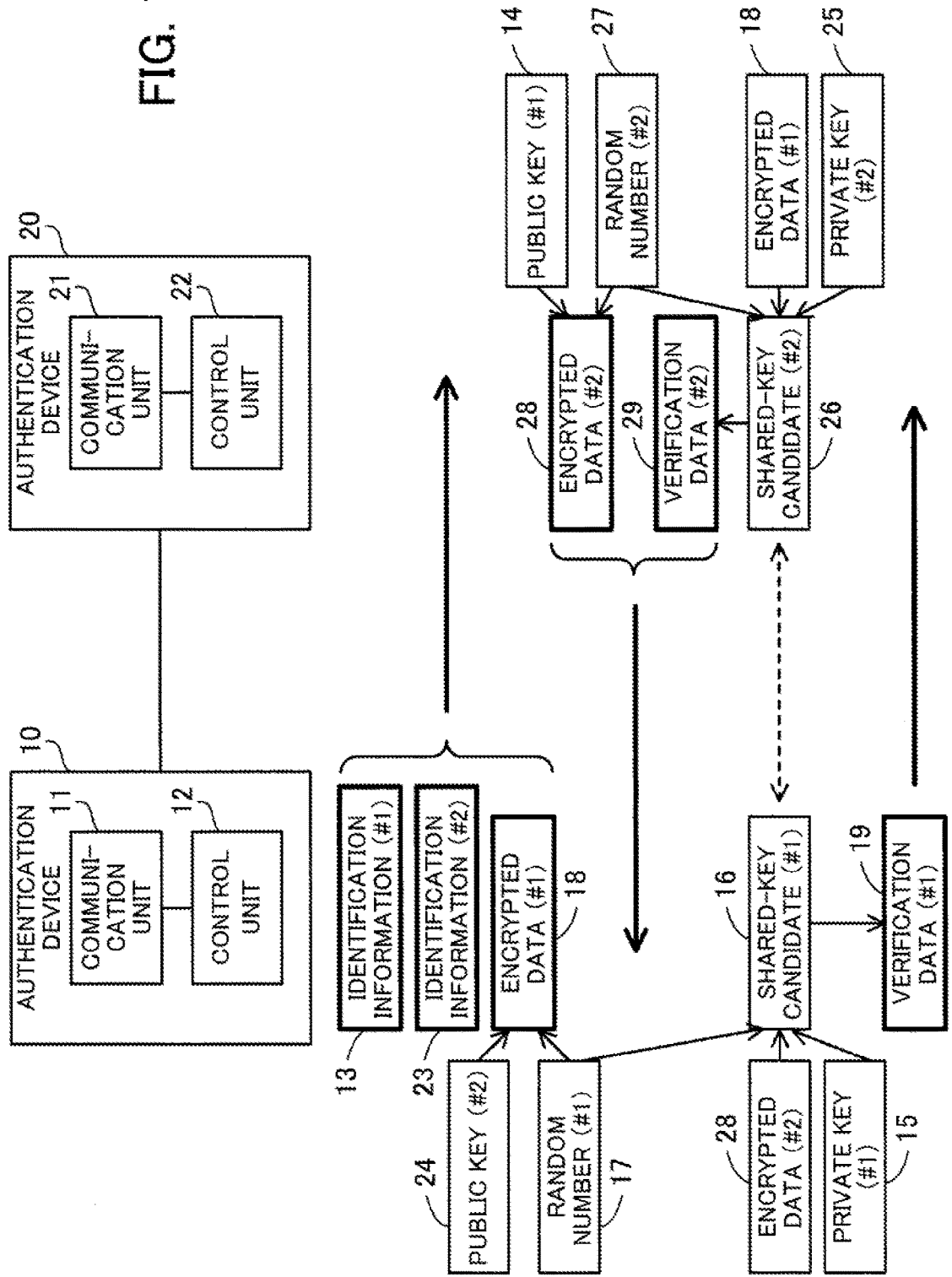
FIG. 1 illustrates an example of an authentication system according to a first embodiment.

Embodiments will be described below with reference to the accompanying drawings, wherein like reference characters refer to like elements throughout.

1. First Embodiment

A first embodiment will be described.

FIG. 1 illustrates an example of an authentication system according to a first embodiment.

The authentication system according to the first embodiment includes authentication devices 10 and 20. The authentication devices 10 and 20 perform mutual authentication and agree on a shared key to be used in data communication. The authentication devices 10 and 20 perform communication via a network. For example, various types of information described in the first embodiment may be included in messages on a protocol such as Transmission Control Protocol (TCP)/Internet Protocol (IP) and then transmitted. For example, the communication procedure described in the first embodiment may be applied to cryptographic communication technology such as SSL/TLS.

The authentication devices 10 and 20 may be devices called information processing devices or computers. The authentication devices 10 and 20 may be portable devices such as mobile phones and laptop personal computers (PC) or may be stationary devices such as desktop PCs and server computers. In the first embodiment, first, the authentication device 10 accesses the authentication device 20. Thus, the authentication device 10 may be called a client, and the authentication device 20 may be called a server.

The authentication device 10 includes a communication unit 11 and a control unit 12. The authentication device 20 includes a communication unit 21 and a control unit 22. Each of the communication units 11 and 21 is a communication interface that communicates with the other device. Each of the communication units 11 and 21 may be a wired interface that performs communication via a cable or may be a wireless interface that performs communication via a wireless link.

For example, each of the control units 12 and 22 is a processor such as a central processing unit (CPU) or a digital signal processor (DSP). However, each of the control units 12 and 22 may include an electronic circuit for specific use such as an application specific integrated circuit (ASIC) or a field programmable gate array (FPGA). These processors execute programs stored in memories such as random access memories (RAMs). The programs include an authentication program in which the processing to be described below is written. A group of processors (multiprocessor) may be referred to as a "processor."

Identification information 13 (first identification information) is associated with the authentication device 10. The identification information 13 is information about the authentication device 10 or a user of the authentication device 10. For example, an IP address, a host name, or a device number of the authentication device 10 may be used as the identification information 13. For example, a user ID or a telephone number of the user of the authentication device 10 may be used. Likewise, identification information 23 (second identification information) is associated with the authentication device 20. The identification information 23 is information about the authentication device 20 or a user of the authentication device 20.

Regarding the authentication device 10, a public key 14 (a first public key) and a private key 15 (a first private key) used in public key cryptography technology are defined. While the public key 14 has been made public, the private key 15 is secretly held only by the authentication device 10. Data encrypted with the public key 14 can be decrypted only with the private key 15. The public key 14 and the private key 15 are associated with the identification information 13. Likewise, regarding the authentication device 20, a public key 24 (a second public key) and a private key 25 (a second private key) used in public key cryptography technology are defined. While the public key 24 has been made public, the private key 25 is secretly held only by the authentication device 20. Data encrypted with the public key 24 can be decrypted only with the private key 25. The public key 24 and the private key 25 are associated with the identification information 23.

If ID-based cryptography is used as public key cryptography technology, the authentication device 10 can generate the public key 24 from the identification information 23. In addition, the authentication device 20 can generate the public key 14 from the identification information 13. However, in the first embodiment, public key cryptography technology other than ID-based cryptography may be used. The authentication device 10 may search a database that exists inside or outside the authentication device 10 for the public key 24 corresponding to the identification information 23 or may directly acquire the public key 24 from the authentication device 20. The authentication device 20 may search a database that exists inside or outside the authentication device 20 for the public key 14 corresponding to the identification information 13 or may directly acquire the public key 14 from the authentication device 10.

The communication unit 11 performs communication with the authentication device 20 as follows. The communication unit 11 transmits the identification information 13 and 23 and encrypted data 18 (first encrypted data) to the authentication device 20. After transmitting the encrypted data 18, the communication unit 11 receives encrypted data 28 (second encrypted data) and verification data 29 (second verification data) from the authentication device 20. After receiving the verification data 29, the communication unit 11 transmits verification data 19 (first verification data) to the authentication device 20.

The control unit 12 generates the encrypted data by generating a random number 17 (a first random number) and encrypting the random number 17 by using the public key 24 corresponding to the identification information 23. When the communication unit 11 receives the encrypted data 28, the control unit 12 generates a shared-key candidate 16 (a first shared-key candidate) from the random number 17, the encrypted data 28, and the private key 15. The control unit 12 generates the verification data 19 by using the shared-key candidate 16. For example, the verification data 19 is encrypted with the shared-key candidate 16. When the communication unit 11 receives the verification data 29, the control unit 12 examines the verification data 29 by using the shared-key candidate 16. For example, the control unit 12 creates verification data that corresponds to the verification data 29 in the same method as that used by the authentication device 20 and compares the created verification data with the verification data 29. In this case, if both of the verification data match, the control unit 12 verifies the verification data. If not, the control unit 12 does not verify the verification data.

The communication unit 21 performs communication with the authentication device 10 as follows. The communication unit 21 receives the identification information 13 and 23 and the encrypted data 18 from the authentication device 10. After receiving the encrypted data 18, the communication unit 21 transmits the encrypted data 28 and the verification data 29 to the authentication device 10. After transmitting the verification data 29, the communication unit 21 receives the verification data 19 from the authentication device 10.

When the communication unit 21 receives the identification information 13, the control unit 22 generates the encrypted data 28 by generating a random number 27 (a second random number) and encrypting the random number 27 by using the public key 14 corresponding to the identification information 13. When the communication unit 21 receives the encrypted data 18, the control unit 22 generates a shared-key candidate 26 (a second shared-key candidate) from the random number 27, the encrypted data 18, and the private key 25. The control unit 22 generates the verification data 29 by using the shared-key candidate 26. For example, the verification data 29 is encrypted with the shared-key candidate 26. When the communication unit 21 receives the verification data 19, the control unit 22 examines the verification data 19 by using the shared-key candidate 26. For example, the control unit 22 creates verification data that corresponds to the verification data 19 in the same method as that used by the authentication device 10 and compares the created verification data with the verification data 19. In this case, if both of the verification data match, the control unit 22 verifies the verification data. If not, the control unit 22 does not verify the verification data.

If the control units 12 and 22 verify the verification data 19 and 29, the shared-key candidates 16 and 26 are determined to be the same. Namely, a shared key is agreed between the authentication devices 10 and 20. Thereafter, the authentication device 10 performs cryptographic communication by using the shared-key candidate 16 as the shared key, and the authentication device 20 performs cryptographic communication by using the shared-key candidate 26 as the shared key.

In addition, since the random number 17 is encrypted with the public key 24 of the authentication device 20, only the authentication device 20 having the private key 25 corresponding to the public key 24 can recognize the random number 17. In addition, since the random number 27 is encrypted with the public key 14 of the authentication device 10, only the authentication device 10 having the private key 15 corresponding to the public key 14 can recognize the random number 27. Thus, by determining that the same shared key has been generated, each of the authentication devices 10 and 20 can authenticate its communication peer.

When the communication unit 21 receives the identification information 13 and 23, the control unit 22 may determine whether to accept the identification information 13 and 23. If the control unit 22 accepts the identification information 13 and 23, the control unit 22 continues the above processing. However, if the control unit 22 does not accept at least one of the identification information 13 and 23, the control unit 22 may terminate the communication with the authentication device 10. For example, the control unit 22 does not accept the identification information 13 when the identification information 13 is not included in a predetermined whitelist or is listed in a predetermined blacklist. For example, the control unit 22 does not accept the identification information 23 when the identification information 23 does not represent the authentication device 20 or when the identification information 23 is expired. In this case, the control unit 22 may choose different identification information as the identification information 23 of the authentication device 20 and give a chance for retransmission of the encrypted data 18.

Next, the efficiency of the communication procedure according to the first embodiment will be examined.

The following communication procedure is possible as another example of the communication procedure performed by the authentication devices 10 and 20. First, the authentication device 10 transmits the identification information 13 to the authentication device 20. In response to the access by the authentication device 10, the authentication device 20 transmits the identification information 23 and the encrypted data 28 to the authentication device 10. Since the authentication device has not received the encrypted data 18 yet, the authentication device 20 does not transmit the verification data 29 at this point. The authentication device 10 transmits the encrypted data 18 and the verification data 19 to the authentication device 20. The authentication device 20 transmits the verification data to the authentication device 10. In accordance with this example of the communication procedure, four communications are performed between the authentication devices 10 and 20.

In contrast, in accordance with the communication procedure according to the first embodiment, the encrypted data 18 is transmitted earlier from the authentication device 10 to the authentication device 20 along with the identification information 13. Namely, the encrypted data 18 is transmitted before the encrypted data 28 is transmitted. Thus, as a reply to this transmission, the verification data 29 can be transmitted from the authentication device 20 to the authentication device 10 along with the encrypted data 28. Namely, the verification data 29 is transmitted before the verification data 19 is transmitted. As a result, after the verification data 19 is transmitted from the authentication device 10 to the authentication device 20, since the authentication device 20 does not need to transmit the verification data 29 to the authentication device 10, the number of communications is reduced to 3. Thus, the authentication time between the authentication devices 10 and 20 is shortened.

2. Second Embodiment

Next, a second embodiment will be described. The second embodiment provides a mechanism of reducing the communication load caused when a handshake is performed by using cryptographic communication technology such as SSL or TLS.

In a handshake performed when a TLS communication is started, messages such as a ClientHello, a ServerHello, a ServerHelloDone, a ChangeCipherSpec, a Certificate(S), a ServerKeyExchange, a ClientKeyExchange, a Finished(C), and a Finished(S) are exchanged. When ephemeral Diffie-Hellman key exchange (DHE) is performed in mutual authentication, the following messages are exchanged between a client device that operates as a handshake initiator and a server device that operates as a responder.

First, the client device transmits a ClientHello. When receiving the ClientHello, the server device transmits a ServerHello, a Certificate(S), and a ServerKeyExchange to the client device. A certificate is included in the Certificate (S). A key material (server-generated key material) used when the client device generates a shared key is included in the ServerKeyExchange. How a server-generated key material is generated will be described below.

When receiving the ServerKeyExchange, the client device examines the certificate in the Certificate(S) and generates a key material (client-generated key material) by using a public key of the server device included in the certificate. The client device generates master private information by using the key material (client-generated key material) used when the server device generates a shared key and the server-generated key material. In addition, the client device generates a verifier (client-generated verifier) by using the master private information. How the client-generated key material and the master private information are generated will be described below.

The client device includes the client-generated key material in a ClientKeyExchange, includes the client-generated verifier in a Finished(C), and transmits the ClientKeyExchange and the Finished(C) to the server device. When receiving the ClientKeyExchange and the Finished(C), the server device generates master private information, which is the same as that generated by the client device, by using the server-generated key material and the client-generated key material. The server device examines the client-generated verifier and generates a verifier (server-generated verifier) by using the master private information.

The server device includes the server-generated verifier in the Finished(S) and transmits the Finished(S) to the client device. When receiving the Finished(S), the client device examines the server-generated verifier included in the Finished(S). If the client-generated verifier and the server-generated verifier are verified, it is determined that no key material has been falsified during the processing. Namely, it is determined that key exchange and key agreement have accurately been performed. Thereafter, the client device and the server device are able to perform secure data communication by using the master private information.

The above sequence is only an example. For example, as a variation, the processing about the Certificate(S) or the like and the verification processing about the certificate may be omitted. In addition, as a variation, ID-based cryptography may be used in the generation of the key material included in the ServerKeyExchange or the ClientKeyExchange and in the generation of the master private information. In addition, as a variation, an identifier may be included in the ClientHello or the ServerHello to be transmitted. As a variation, public parameters for ID-based cryptography may be included in the ClientHello.

The technique according to the second embodiment provides a mechanism of reducing the number of times of communication of a group of messages that can be transmitted continuously without receiving a reply from a communication peer when a handshake as described above is performed.

Next, a mechanism of key exchange, including a method of generating a key and key material, will be described.

Hereinafter, a characteristic will be denoted by p, and an additive cyclic group on an elliptic curve defined by a prime field $F_p$ will be denoted by $E(F_p)$. In addition, a largest prime number with which the order $\#E(F_p)$ of $E(F_p)$ is dividable will be denoted by r, and k that satisfies $r|p^k-1$ will be referred to as an embedding degree. In addition, $r|p^k-1$ represents that r is a divisor of $p^k-1$. In addition, an additive subgroup of the order r in $E(F_p)$ will be denoted by $E(F_p)\{r\}$.

A bilinear map e is defined by the following expression (1). The bilinear map e is represented by a function (pairing function) that receives an element of a cyclic group $G_1$ and an element of a cyclic group $G_2$ as inputs and outputs an element on an extension field $G_3$. G/H represents a quotient group or a factor group of G with respect to H. In addition, $F_{p^k}*/(F_{p^k}*)^r$ represents a cyclic group formed by elements of $F_{p^k}*$ that represents 1 when raised to the r-th power.

$$e: G_2 \times G_1 \to G_3 \text{ (or } e: G_1 \times G_2 \to G_3),$$

wherein $$G_1: E(F_p)\{r\},$$

$$G_2: E(F_{p^k})\{r\},$$

$$G_3: F_{p^k}*/(F_{p^k}*)^r \tag{1}$$

In addition, a group of integers from 0 to (r−1) will be denoted by $Z_r$. Regarding elements α of $Z_r$ ($\alpha \in Z_r$) and an element P of the cyclic group $G_1$ or $G_2$ ($P \in G_1$ or $G_2$), the scalar multiplication αP is defined as an operation in which addition of P is performed a times. In addition, regarding elements x of the extension field $G_3$ ($x \in G_3$), the power multiplication $x^\alpha$ is defined as an operation in which multiplication of x is performed a times. In this case, bilinearity is a property that satisfies the following expression (2).

$$e(xP,Q)=e(P,xQ)=e(P,Q)^x \qquad (2)$$

A private key generator (PKG) that determines and secretly holds a master private key s (s∈$Z_r$) determines P (P∈$G_1$), Q (Q∈$G_2$), e, H (hash function), and $P_0$ ($P_0$=sP∈$G_1$) as public parameters and makes these public parameters (P,Q,e,H,$P_0$) public. The master private key s is different from the above master private information.

For example, assuming that the server device and the client device correspond to an identifier $ID_A$ and an identifier $ID_B$, respectively, and that the server device and the client device know the identifier $ID_A$ and $ID_B$, a public key $P_A$ corresponding to the identifier $ID_A$ is defined by the following expression (3) and can be calculated by anyone by using the public parameters. Likewise, a public key $P_B$ corresponding to the identifier $ID_B$ is defined by the following expression (4) and can be calculated by anyone by using the public parameters.

A private key $S_A$ corresponding to the identifier $ID_A$ is defined by the following expression (5) and can be calculated by the PKG holding the master private key s. Likewise, a private key $S_B$ corresponding to the identifier $ID_B$ is defined by the following expression (6) and can be calculated by the PKG holding the master private key s. The PKG provides an authorized entity (the server device) that has a right to be authenticated by means of the identifier $ID_A$ with the private key $S_A$. In addition, the PKG provides an authorized entity (the client device) that has a right to be authenticated by means of the identifier $ID_B$ with the private key $S_B$.

$$P_A = aP + P_0 = (a+s)P, \qquad (3)$$

wherein a=H($ID_A$)

$$P_B = b_p + P0 = (b+s)P, \qquad (4)$$

wherein b=H($ID_B$)

$$S_A = (a+s)^{-1}Q \qquad (5)$$

$$S_B = (b+s)^{-1}Q \qquad (6)$$

When key exchange is performed between the client device and the server device, the server device generates a random number $r_A$ and generates a server-generated key material $R_A$ ($R_A$=$r_A P_B$) by using the public key $P_B$. Next, the server device transmits the server-generated key material $R_A$ to the client device. The client device generates a random number $r_B$ and generates a client-generated key material $R_B$ ($R_B$=$r_B P_A$) by using the public key $P_A$. Next, the client device transmits the client-generated key material $R_B$ to the server device.

When receiving the server-generated key material $R_A$, the client device calculates a shared key $Z_B$ ($Z_B$=e($R_A$, $r_B S_B$)) by using the private key $S_B$, the server-generated key material $R_A$, the random number $r_B$, and a public parameter. When receiving the client-generated key material $R_B$, the server device calculates a shared key $Z_A$ ($Z_A$=e($R_B$,$r_A S_A$)) by using the private key $S_A$, the client-generated key material $R_B$, the random number $r_A$, and a public parameter. These keys generated as described above are sometimes called session keys. However, herein, these keys will be called shared keys.

Unless the server-generated key material $R_A$ and the client-generated key material $R_B$ are falsified while transmitted, the above shared keys $Z_A$ and $Z_B$ match, as calculated by the following expressions (7) and (8). Namely, the server device and the client device are able to obtain a shared key, and the key exchange is completed. In the handshake performed when the TLS communication is started, whether falsification has been performed is determined by using a client-generated verifier and a server-generated verifier.

$$\begin{aligned}Z_B &= e(R_A, r_B S_B) \\ &= e(r_A P_B, r_B S_B) \\ &= e(P_B, S_B)^{r_A r_B} \\ &= e((b+s)P, (b+s)^{-1}Q)^{r_A r_B} \\ &= e(P, Q)^{r_A r_B}\end{aligned} \qquad (7)$$

$$\begin{aligned}Z_A &= e(R_B, r_A S_A) \\ &= e(r_B P_A, r_A S_A) \\ &= e(P_A, S_A)^{r_A r_B} \\ &= e((a+s)P, (a+s)^{-1}Q)^{r_A r_B} \\ &= e(P, Q)^{r_A r_B}\end{aligned} \qquad (8)$$

Other than the above way, there is another way of performing key exchange using ID-based cryptography. For example, a random number may be encrypted with a public key of a communication peer, and the encrypted random number may be used as the key material. In this case, since the communication peer that has received the key material can decrypt the random number from the key material by using the private key, the decrypted random number can be used as a shared key.

In TLS, the above shared keys $Z_A$ and $Z_B$ are used as pre-master private information, and master private information is generated from the pre-master private information. Next, by encrypting communication data with the master private information, cryptographic communication between the client device and the server device is realized. A mechanism of generating the master private information from the pre-master private information is determined as follows in the TLS specification.

Processing for generating the master private information (master_secret) from the pre-master private information (pre_master_secret) is defined as represented by the following expression (9) in the TLS specification (for example, see "by T. Dierks and C. Allen, The TLS Protocol Version 1.0, IETF Request for Comments (RFC) 2246, January 1999").

$$\text{master\_secret}=PRF(\text{pre\_master\_secret},\text{"master secret"},\text{ClientHello.random}+\text{ServerHello.random})\{0\ldots47\} \qquad (9)$$

In the above expression (9), "master secret" represents a byte string corresponding to a fixed character string (label) "master secret." In addition, ClientHello.random and ServerHello.random are random numbers transmitted in a ClientHello and a ServerHello, respectively. In addition, {0 . . . 47} signifies the initial 48 bytes of an output value outputted by a PRF that can output a byte string of any length. The PRF is defined as indicated by the following expression (10).

$$PRF(\text{secret},\text{label},\text{seed})=P\_MD5(S_{01},\text{label}+\text{seed})\text{XOR } P\_SHA\text{-}1(S_{02},\text{label}+\text{seed}) \qquad (10)$$

In the above expression (10), "secret" is a private key. Assuming that the "secret" is divided into two portions of a first half and a second half in terms of bytes, $S_{01}$ is a byte string of the first half and $S_{02}$ is a byte string of the second half. If the number of bytes of the "secret" is an odd number, the byte of the center of the "secret" is used redundantly as the last byte of the byte string $S_{01}$ and as the first byte of the byte string $S_{02}$. In addition, "+" signifies concatenation of byte strings.

P_hash(secret,seed) generates a byte string of any length from the private value "secret" and additional information "seed" by using a hash function hash. This P_hash(secret, seed) is defined as indicated by the following expression (11). HMAC_hash(secret,value) is a hash-based message authentication code (HMAC) with respect to a value. In addition, when i=1, 2, 3, . . . , a function A is defined as indicated by the following expression (12).

$$P\_hash(secret,seed)=HMAC\_hash(secret,A(1)+seed)+ \\ HMAC\_hash(secret,A(2)+seed)+HMAC\_hash \\ (secret,A(3)+seed)+ \quad (11)$$

$$A(0)=seed,$$

$$A(i)=HMAC\_hash(secret,A(i-1)) \quad (12)$$

The master private information is given as a result obtained by performing XOR on a value extended to 48 bytes by HMAC-MD1 and a value extended to 48 bytes by HMAC-SHA-1, using the pre-master private information as a private key and concatenation of the random numbers included in a ClientHello and a ServerHello as the additional information (seed).

[2-1. System]

Figure 2:
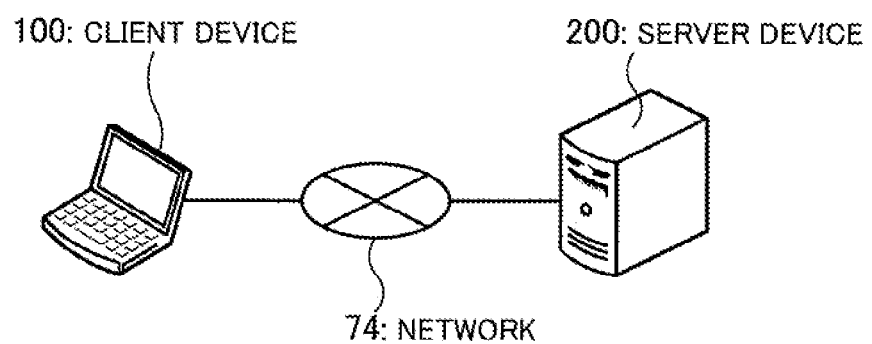
FIG. 2 illustrates an example of a system according to a second embodiment.

Next, a system according to a second embodiment will be described with reference to FIG. 2. FIG. 2 illustrates an example of the system according to the second embodiment.

As illustrated in FIG. 2, the system according to the second embodiment includes a client device 100 and a server device 200 connected to each other via a network 74.

The client device 100 and the server device 200 are computers. For example, the client device 100 is a computer such as a mobile phone, a smartphone, a tablet terminal, or a PC. For example, the server device 200 is a computer such as a PC or a general-purpose computer.

The client device 100 is a computer that operates as an initiator when a handshake is performed. The server device 200 is a computer that operates as a responder when a handshake is performed.

The network 74 is a wired or wireless network. For example, the client device 100 is able to include information in a message on a protocol such as TCP/IP and transmit the message including the information to the server device 200. For example, the server device 200 is able to include information in a message on a protocol such as TCP/IP and transmit the message including the information to the client device 100.

The following description will be made by using the system in FIG. 2 as an example.

[2-2. Hardware]

Figure 3:
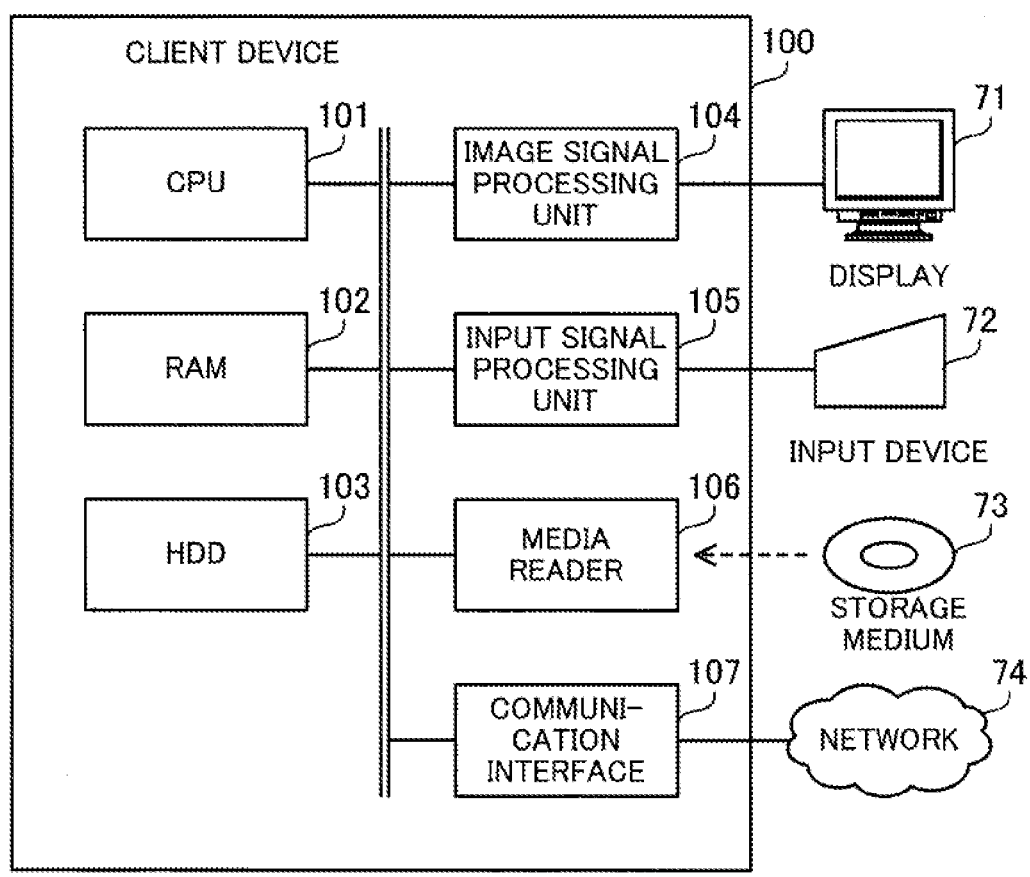
FIG. 3 illustrates an example of a hardware configuration capable of realizing functions of a client device according to the second embodiment.

First, a hardware configuration of the client device 100 will be described with reference to FIG. 3. FIG. 3 illustrates an example of a hardware configuration capable of realizing functions of the client device 100 according to the second embodiment.

The client device 100 includes a CPU 101, a RAM 102, a hard disk drive (HDD) 103, an image signal processing unit 104, an input signal processing unit 105, a media reader 106, and a communication interface 107. The CPU 101 is an example of the control unit 12 according to the first embodiment.

The CPU 101 is a processor which includes an arithmetic circuit that executes program instructions. The CPU 101 loads at least a part of the programs or data held in the HDD 103 to the RAM 102 and executes the program.

The CPU 101 may include a plurality of processor cores, and the client device 100 may include a plurality of processors. The processing described below may be executed in parallel by using a plurality of processors or processor cores. In addition, a group of processors (multiprocessor) may be referred to as a "processor."

The RAM 102 is a volatile memory that temporarily holds a program executed by the CPU 101 or data used by the CPU 101 for calculation. The client device 100 may include a different kind of memory other than a RAM. The client device 100 may include a plurality of memories.

The HDD 103 is a non-volatile storage device that holds software programs, such as an operating system (OS) and application software, and data. The client device 100 may include a different kind of storage device such as a flash memory or a solid state drive (SSD). The client device 100 may include a plurality of non-volatile storage devices.

The image signal processing unit 104 outputs an image to a display 71 connected to the client device 100 in accordance with instructions from the CPU 101. Examples of the display 71 include a cathode ray tube (CRT) display, a liquid crystal display (LCD), a plasma display panel (PDP), and an organic electro-luminescence (OEL) display.

The input signal processing unit 105 acquires an input signal from an input device 72 connected to the client device 100 and outputs the input signal to the CPU 101.

Examples of the input device 72 include a pointing device such as a mouse, a touch panel, a touch pad, or a trackball, a keyboard, a remote controller, and a button switch. A plurality of kinds of input devices may be connected to the client device 100. At least one of the display 71 and the input device 72 may be integrally formed with the enclosure of the client device 100.

The media reader 106 is a reading device that reads programs or data recorded in a storage medium 73. Examples of the storage medium 73 include a magnetic disk such as a flexible disk (FD) or an HDD, an optical disc such as a compact disc (CD) or a digital versatile disc (DVD), a magneto-optical disk (MO), and a semiconductor memory. For example, the media reader 106 stores a program or data read out from the storage medium 73 in the RAM 102 or the HDD 103.

The communication interface 107 is connected to the network 74 and communicates with other information processing devices via the network 74. The communication interface 107 may be a wired communication interface connected to a communication device such as a switch via a cable or may be a wireless communication interface connected to a base station via a wireless link.

An example of the hardware configuration of the client device 100 has thus been described. Functions of the server device 200 can also be realized by using the same hardware configuration as that of the client device 100 illustrated in FIG. 3. Thus, detailed description of the hardware configuration that can realize the functions of the server device 200 will be omitted.

[2-3. Functions]

Next, functions of the client device 100 and the server device 200 will be described.

(Client Device 100)

Figure 4:
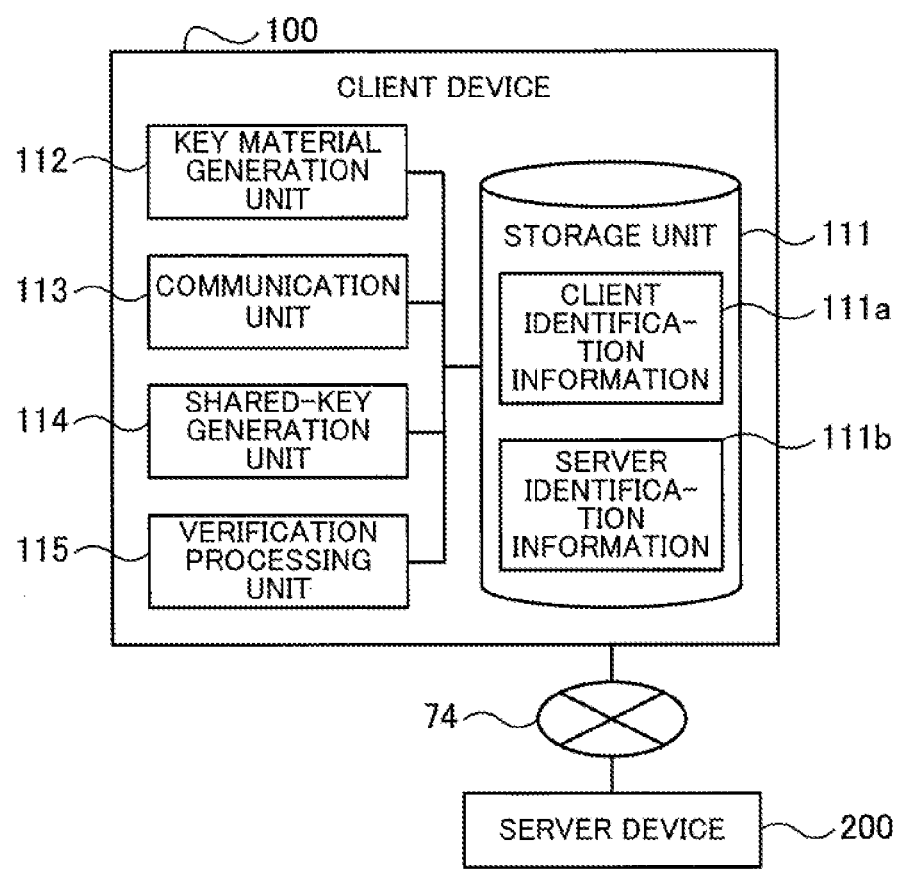
FIG. 4 is a block diagram illustrating an example of functions of the client device according to the second embodiment.

First, functions of the client device 100 will be described with reference to FIG. 4. FIG. 4 is a block diagram illustrating an example of functions of the client device 100 according to the second embodiment.

As illustrated in FIG. 4, the client device 100 includes a storage unit 111, a key material generation unit 112, a communication unit 113, a shared-key generation unit 114, and a verification processing unit 115.

Functions of the storage unit 111 may be realized by using the above RAM 102 or the HDD 103, for example. Functions of the key material generation unit 112, the shared-key generation unit 114, and the verification processing unit 115 may be realized by using the above CPU 101, for example. Functions of the communication unit 113 may be realized by using the above CPU 101 or the communication interface 107, for example.

The storage unit 111 holds client identification information 111a and server identification information 111b. The client identification information 111a is identification information for identifying the client device 100. The server identification information 111b is identification information for identifying the server device 200. Public parameters made public by a PKG and a private key provided by the PKG are stored in the storage unit 111.

The key material generation unit 112 generates a random number and generates a client-generated key material by using the generated random number and a public key of the server device 200. The communication unit 113 transmits messages such as a ClientHello, a ClientKeyExchange, and a Finished(C) to the server device 200. In addition, the communication unit 113 receives messages such as a ServerHello, a ServerKeyExchange, and a Finished(S) from the server device 200.

The shared-key generation unit 114 generates master private information by using a server-generated key material included in a message received from the server device 200, the random number generated by the key material generation unit 112, the public parameters, and the private key provided by the PKG. The verification processing unit 115 generates a client-generated verifier by using the master private information generated by the shared-key generation unit 114. In addition, the verification processing unit 115 examines the server-generated verifier included in a message received from the server device 200.

(Server Device 200)

Figure 5:
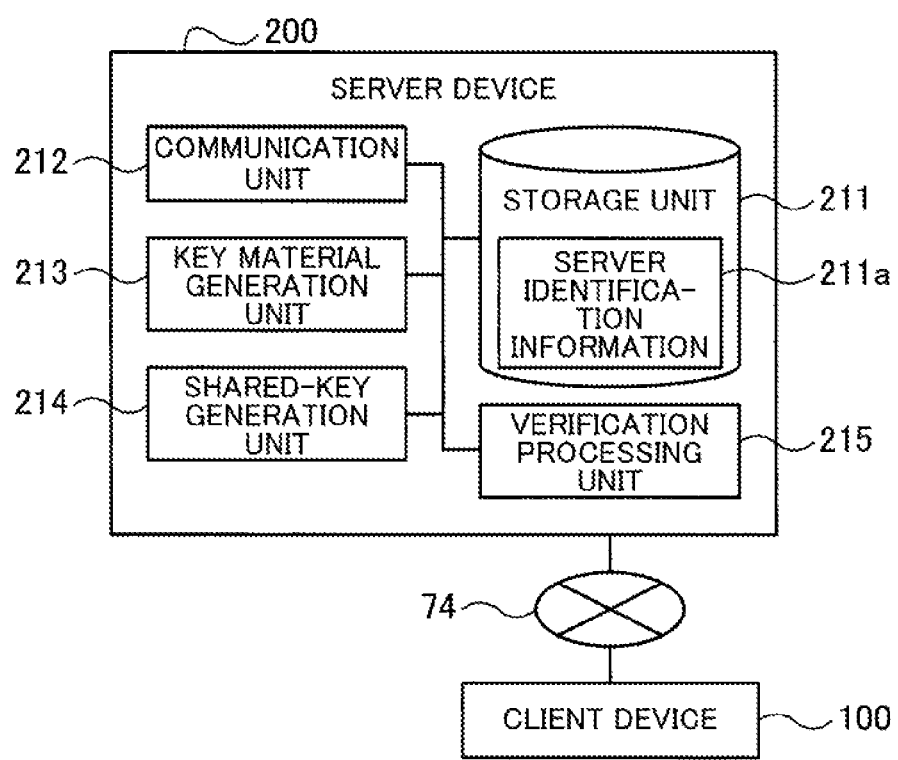
FIG. 5 is a block diagram illustrating an example of functions of a server device according to the second embodiment.

Next, functions of the server device 200 will be described with reference to FIG. 5. FIG. 5 is a block diagram illustrating an example of functions of the server device 200 according to the second embodiment.

As illustrated in FIG. 5, the server device 200 includes a storage unit 211, a communication unit 212, a key material generation unit 213, a shared-key generation unit 214, and a verification processing unit 215.

Functions of the storage unit 211 may be realized by using hardware resources corresponding to the above RAM 102 or HDD 103, for example. Functions of the key material generation unit 213, the shared-key generation unit 214, and the verification processing unit 215 may be realized by using hardware resources corresponding to the above CPU 101, for example. Functions of the communication unit 212 may be realized by using hardware resources corresponding to the above CPU 101 or communication interface 107, for example.

Server identification information 211a is stored in the storage unit 211. The server identification information 211a is identification information for identifying the server device 200. Public parameters made public by a PKG and a private key provided by the PKG are stored in the storage unit 211. A list of client identification information for determining authorized client devices may also be stored in the storage unit 211.

The communication unit 212 receives messages such as a ClientHello, a ClientKeyExchange, and a Finished(C) from the client device 100. The communication unit 212 transmits messages such as a ServerHello, a ServerKeyExchange, and a Finished(S) to the client device 100. The key material generation unit 213 generates a random number and generates a server-generated key material by using the generated random number and a public key of the client device 100.

The shared-key generation unit 214 generates master private information by using a client-generated key material included in a message received from the client device 100, the random number generated by the key material generation unit 213, the public parameters, and the private key provided by the PKG. The verification processing unit 215 generates a server-generated verifier by using the master private information generated by the shared-key generation unit 214. In addition, the verification processing unit 215 examines the client-generated verifier included in a message received from the client device 100.

Functions of the client device 100 and server device 200 have thus been described.

[2-4. Flow of Processing]

Next, a flow of authentication processing that the client device 100 and server device 200 perform when performing a handshake will be described.

(Sequence: When There is No Error in Server Identification Information)

Figure 6:
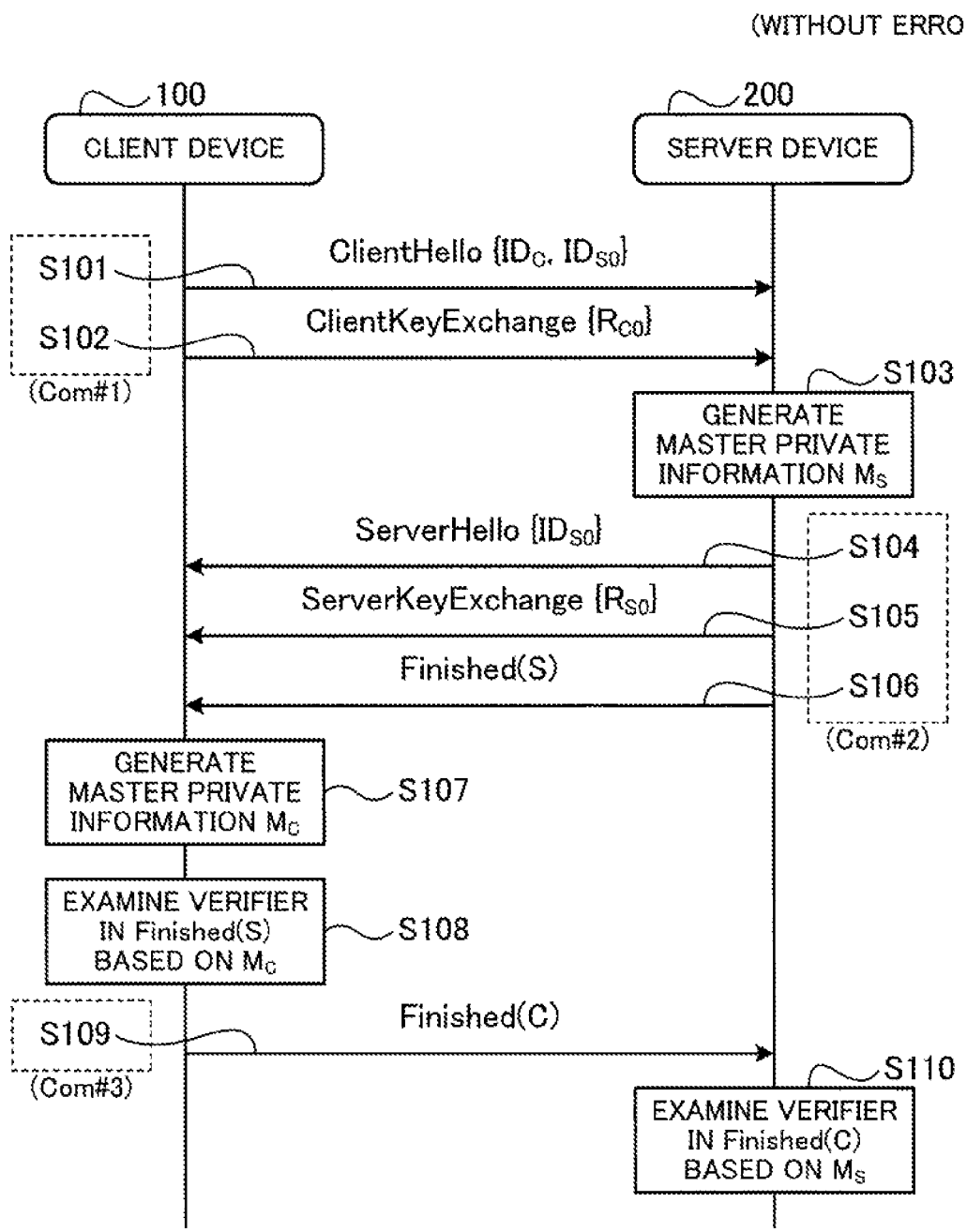
FIG. 6 is a sequence diagram illustrating a flow of authentication processing (without an error) according to the second embodiment.

First, a flow of authentication processing (without an error) performed when the server device 200 accepts the identifier transmitted from the client device 100 to the server device 200 as the server identification information used in the authentication processing will be described with reference to FIG. 6. FIG. 6 is a sequence diagram illustrating a flow of authentication processing (without an error) according to the second embodiment.

The following description assumes that the client device 100 and the server device 200 hold the public parameters $(P,Q,e,H,P_0)$ made public by the PKG. Among the parameters, P represents a generator of the cyclic group $G_1$, Q represents a generator of the cyclic group $G_2$, e represents a bilinear map given by the above expression (1), H represents a hash function, $P_0$ represents a generator of the cyclic group $G_1$ generated from the master private key s secretly held by the PKG and P ($P_0=sP \in G_1$).

In addition, the following description assumes that the client device 100 holds a private key $S_C$ ($S_C=(H(ID_C)+s)^{-1}Q$) provided by the PKG and that the server device 200 holds at least a private key $S_{S0}$ ($S_{S0}=(H(ID_{S0})+s)^{-1}Q$) or a private key $S_{S1}$ ($S_{S1}=(H(ID_{S1})+s)^{-1}Q$) provided by the PKG. In addition, the following description assumes that at least an identifier $ID_{S0}$ or an identifier $ID_{S1}$ can be used as an identifier that identifies the server device 200.

(S101) The communication unit 113 includes the client identification information 111a (an identifier $ID_C$) and the server identification information 111b (the identifier $ID_{S0}$) used in the authentication processing in a ClientHello. As needed, such a ClientHello including the identifiers $ID_C$ and $ID_{S0}$ will be referred to as a ClientHello$\{ID_C,ID_{S0}\}$. The communication unit 113 transmits the ClientHello$\{ID_C, ID_{S0}\}$ to the server device 200.

(S102) The key material generation unit 112 generates a random number $r_C$. In addition, the key material generation unit 112 generates a public key $P_{S0}$ ($P_{S0}=H(ID_{S0})P+P_0$) of the server device 200 by using the public parameters H, P, and $P_0$ and the identifier $ID_{S0}$. Next, the key material generation unit 112 generates a client-generated key material $R_{C0}$ ($R_{C0}=r_CP_{S0}$) by using the random number $r_C$ and the public key $P_{S0}$ of the server device 200.

The communication unit 113 includes the client-generated key material $R_{C0}$ in a ClientKeyExchange. As needed, such a ClientKeyExchange including the client-generated key material $R_{C0}$ will be referred to as a ClientKeyExchange$\{R_{C0}\}$. The communication unit 113 transmits the ClientKeyExchange$\{R_{C0}\}$ to the server device 200.

The client device 100 can transmit these ClientHello and ClientKeyExchange to the server device 200 without receiving a reply from the server device 200. Thus, in the example in FIG. 6, the client device 100 transmits the ClientHello$\{ID_C, ID_{S0}\}$ and the ClientKeyExchange$\{R_{C0}\}$ as a message group (Com#1) that the client device 100 can transmit without receiving a reply from the server device 200. As needed, transmission of such a message group will be referred to as a flight. For example, Com#1 is a single flight.

(S103) The communication unit 212 receives the ClientHello$\{ID_C, ID_{S0}\}$ and the ClientKeyExchange$\{R_{C0}\}$.

The key material generation unit 213 generates a random number $r_{S0}$. In addition, the key material generation unit 213 generates a public key $P_C$ ($P_C = H(ID_C)P + P_0$) of the client device 100 by using the public parameters H, P, and $P_0$ and the identifier $ID_C$ extracted from the ClientHello. In addition, the key material generation unit 213 generates a server-generated key material $R_{S0}$ ($R_{S0} = r_{S0}P_C$) by using the random number $r_{S0}$ and the public key $P_C$.

The shared-key generation unit 214 generates a shared key $Z_S$ by using the client-generated key material $R_{C0}$ extracted from the ClientKeyExchange, the random number $r_{S0}$, the private key $S_{S0}$ corresponding to the identifier $ID_{S0}$, and the public parameter e. In this case, the shared key $Z_S$ is given by the following expression (13). In addition, in accordance with the TLS specification (see the above expressions (9) to (12)), the shared-key generation unit 214 generates master private information $M_S$ by using the shared key $Z_S$ as pre-master private information.

$$Z_S = e(R_{C0}, r_{S0}S_{S0}) \quad (13)$$

(S104) The communication unit 212 includes the identifier $ID_{S0}$ used to generate the shared key $Z_S$ in S103 in a ServerHello. As needed, such a ServerHello including the identifier $ID_{S0}$ will be referred to as a ServerHello$\{ID_{S0}\}$. The communication unit 212 transmits the ServerHello$\{ID_{S0}\}$ to the client device 100.

(S105) The communication unit 212 includes the server-generated key material $R_{S0}$ generated in S103 in a ServerKeyExchange. As needed, such a ServerKeyExchange including the server-generated key material $R_{S0}$ will be referred to as a ServerKeyExchange$\{R_{S0}\}$. The communication unit 212 transmits the ServerKeyExchange$\{R_{S0}\}$ to the client device 100.

(S106) The verification processing unit 215 generates a server-generated verifier (verifier verify_data) by using the master private information $M_S$. The verifier verify_data is a byte string of 12 bytes. In the TLS specification, the verifier verify_data is defined as indicated by the following expression (14).

verify_data=$PRF$(master_secret,finished_label,MD5
(handshake_messages)+SHA-1(handshake_messages))$\{0 \ldots 11\}$ (14)

In the above expression (14), "master secret" represents the master private information $M_S$, and "finished_label" is a byte string corresponding to a fixed character string (label). In the case of the server-generated verifier, "finished_label" is set to a byte string "server finished." In the case of a client-generated verifier to be described below, "finished_label" is set to a byte string "client finished." In addition, "handshake_messages" is a byte string obtained by connecting all the messages exchanged prior to a Finished in which verify_data is included in a handshake.

The verifier verify_data is given as a result obtained by performing XOR on a value extended to 12 bytes by HMAC-MD1 and a value extended to 12 bytes by HMAC-SHA-1, using the master private information as a private key and a byte string obtained by concatenating an MD5 hash value and an SHA-1 hash value of a byte string obtained by connecting all the messages exchanged prior to a Finished in which this verify_data is included as additional information (seed). In addition, $\{0 \ldots 11\}$ signifies the initial 11 bytes of an output value outputted by a PRF that can output a byte string of any length.

In accordance with the above expression (14), the verification processing unit 215 generates the verifier verify_data by using the master private information $M_S$ and uses the generated verifier verify_data as the server-generated verifier. The communication unit 212 includes the server-generated verifier in a Finished(S). Next, the communication unit 212 transmits the Finished(S) to the client device 100.

The server device 200 can transmit these ServerHello, ServerKeyExchange, and Finished(S) to the client device 100 without receiving a reply from the client device 100. Thus, in the example in FIG. 6, the server device 200 transmits the ServerHello$\{ID_{S0}\}$, the ServerKeyExchange$\{R_{S0}\}$, and the Finished(S) as a message group (Com#2) that the server device 200 can transmit without receiving a reply from the client device 100. Namely, Com#2 is a single flight.

(S107) The communication unit 113 receives the ServerHello$\{ID_{S0}\}$, the ServerKeyExchange$\{R_{S0}\}$, and the Finished(S).

The shared-key generation unit 114 generates a shared key $Z_C$ by using the server-generated key material $R_{S0}$ extracted from the ServerKeyExchange, the random number $r_C$, the private key $S_C$ corresponding to the identifier $ID_C$, and the public parameter e. In this case, the shared key $Z_c$ is given by the following expression (15). Next, in accordance with the TLS specification (see the above expressions (9) to (12)), the shared-key generation unit 114 generates master private information $M_C$ by using the shared key $Z_C$ as pre-master private information.

$$Z_C = e(R_{S0}, r_C S_C) \quad (15)$$

(S108) The verification processing unit 115 generates a client-generated verifier (verifier verify_data) by using the master private information $M_C$. In S108, the verification processing unit 115 generates the verifier verify_data by using the same method as that is used for the above master private information $M_S$. However, the generation method differs in that the master private information $M_C$ is used as master_secret and a byte string "client finished" is used as finished_label.

The verification processing unit 115 determines whether the server-generated verifier extracted from the Finished(S) and the client-generated verifier match. If the server-generated verifier and the client-generated verifier match, success of the authentication is determined. In contrast, if the server-generated verifier and the client-generated verifier do not match, failure of the authentication is determined.

(S109) The communication unit 113 includes the client-generated verifier in a Finished(C). Next, the communication unit 113 transmits the Finished(C) to the server device 200. Since the client device 100 can transmit the Finished(C)

(Com#3) without receiving a reply from the server device 200 in response to other messages, this transmission is made in a single flight.

(S110) The verification processing unit 215 determines whether the client-generated verifier extracted from the Finished(C) and the server-generated verifier generated in S106 match. If the server-generated verifier and the client-generated verifier match, success of the authentication is determined. In contrast, if the server-generated verifier and the client-generated verifier do not match, failure of the authentication is determined.

After completion of the processing in S110, the series of processing illustrated in FIG. 6 is ended. As described above, as illustrated in the sequence in FIG. 6, three flights (Com#1, #2, #3) are performed in a handshake.

(Sequence: When There is an Error in Server Identification Information)

Figure 7:
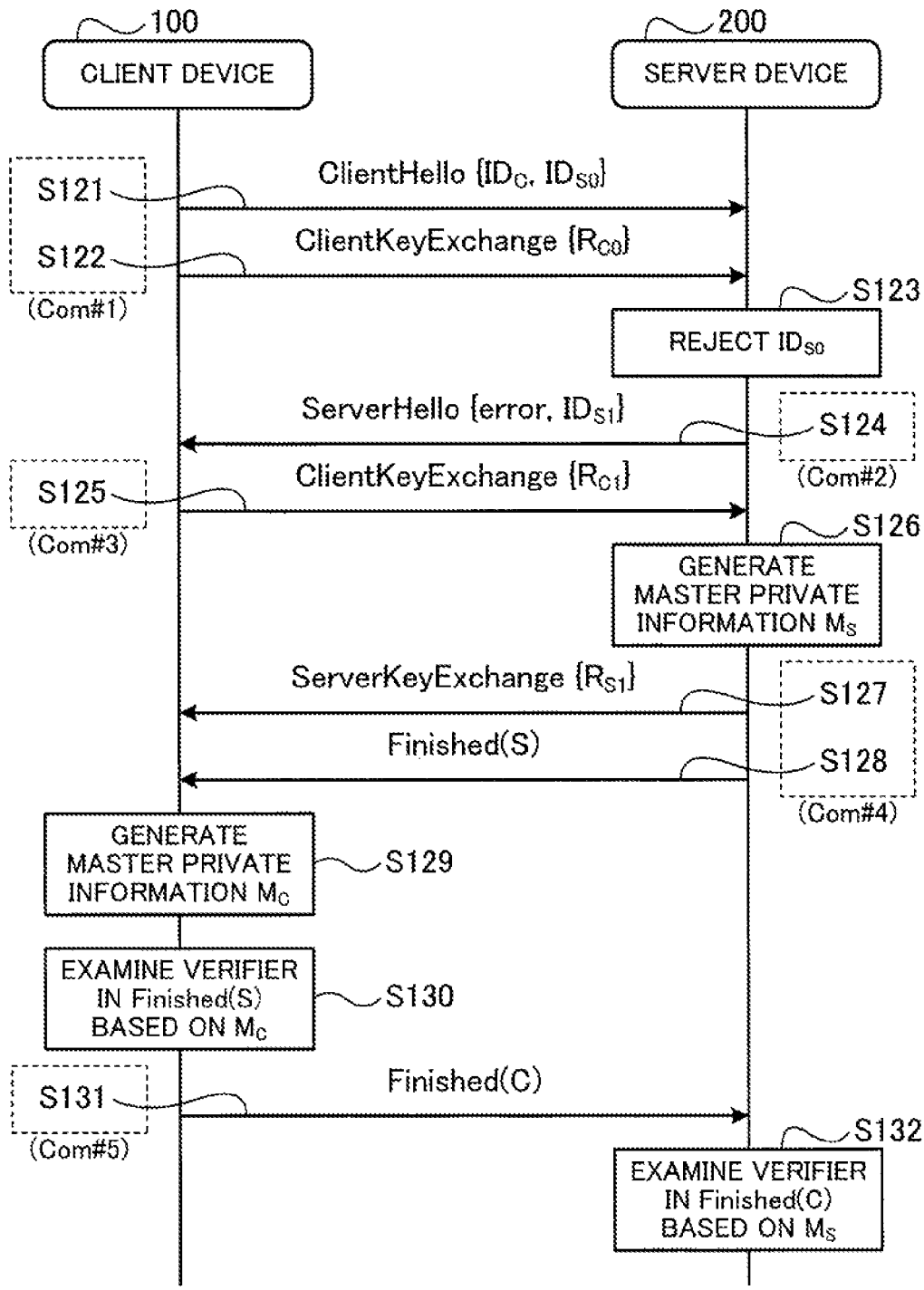
FIG. 7 is a sequence diagram illustrating a flow of authentication processing (with an error) according to the second embodiment.

Next, a flow of authentication processing (with an error) performed when the server device 200 does not accept the identifier transmitted from the client device 100 to the server device 200 as the server identification information used in the authentication processing will be described with reference to FIG. 7. FIG. 7 is a sequence diagram illustrating a flow of authentication processing (with an error) according to the second embodiment.

(S121) The communication unit 113 includes the client identification information 111a (an identifier $ID_C$) and the server identification information 111b (an identifier $ID_{S0}$) used in the authentication processing in a ClientHello. The communication unit 113 transmits the ClientHello{$ID_C$, $ID_{S0}$} to the server device 200.

(S122) The key material generation unit 112 generates a random number $r_{C0}$. In addition, the key material generation unit 112 generates a public key $P_{S0}$ ($P_{S0}=H(ID_{S0})P+P_0$) of the server device 200 by using the public parameters H, P, and $P_0$ and the identifier $ID_{S0}$. Next, the key material generation unit 112 generates a client-generated key material $R_{C0}$ ($R_{C0}=r_{C0}P_{S0}$) by using the random number $r_{C0}$ and the public key $P_{S0}$ of the server device 200.

The communication unit 113 includes the client-generated key material $R_{C0}$ in a ClientKeyExchange. Next, the communication unit 113 transmits the ClientKeyExchange{$R_n$} to the server device 200.

(S123) The communication unit 212 extracts the identifier $ID_{S0}$ from the ClientHello and determines whether to accept the identifier $ID_{S0}$ as the identifier used in this authentication processing. In the example in FIG. 7, the identifier $ID_{S0}$ is not accepted. For example, the identifier $ID_{S0}$ is not accepted when the validity period of the identifier $ID_{S0}$ is expired.

(S124) The communication unit 212 includes an error, which is information indicating occurrence of an error, and an identifier $ID_{S1}$, which is acceptable as the identifier used in the authentication processing, in a ServerHello. As needed, such a ServerHello including the error and the identifier $ID_{S1}$ will be expressed as a ServerHello{error, $ID_{S1}$}. The communication unit 212 transmits the ServerHello{error,$ID_{S1}$} to the client device 100.

(S125) When receiving the ServerHello{error,$ID_{S1}$}, the communication unit 113 determines whether to accept the identifier $ID_{S1}$ and proceed with the authentication processing by using the identifier $ID_{S1}$. In the example in FIG. 7, the identifier $ID_{S1}$ is accepted.

The key material generation unit 112 generates a random number $r_{C1}$. In addition, the key material generation unit 112 generates a public key $P_{S1}$ ($P_{S1}=H(ID_{S1})P+P_0$) of the server device 200 by using the public parameters H, P, and $P_0$ and the identifier $ID_{S1}$. Next, the key material generation unit 112 generates a client-generated key material $R_{C1}$ ($R_{C1}=r_{C1}P_{S1}$) by using the random number $r_{C1}$ and the public key $P_{S1}$ of the server device 200.

The communication unit 113 includes the client-generated key material $R_{C1}$ in a ClientKeyExchange. Next, the communication unit 113 transmits the ClientKeyExchange{$R_{C1}$} to the server device 200.

(S126) The communication unit 212 receives the ClientKeyExchange {$R_{C1}$}. Next, the key material generation unit 213 generates a random number $r_{S1}$. In addition, the key material generation unit 213 generates a public key $P_C$ ($P_C=H(ID_C)P+P_0$) of the client device 100 by using the public parameters H, P, and $P_0$ and the identifier $ID_C$ extracted from the ClientHello. In addition, the key material generation unit 213 generates a server-generated key material $R_{S1}$ ($R_{S1}=r_{S1}P_C$) by using the random number $r_{S1}$ and the public key $P_C$.

The shared-key generation unit 214 generates a shared key $Z_S$ by using the client-generated key material $R_{C1}$ extracted from the ClientKeyExchange, the random number $r_{S1}$, the private key $S_{S1}$ corresponding to the identifier $ID_{S1}$, and the public parameter e. In this case, the shared key $Z_S$ is given by the following expression (16). In addition, in accordance with the TLS specification (see the above expressions (9) to (12)), the shared-key generation unit 214 generates master private information $M_S$ by using the shared key $Z_S$ as pre-master private information.

$$Z_S=e(R_{C1},r_{S1}S_{S1}) \qquad (16)$$

(S127) The communication unit 212 includes the server-generated key material $R_{S1}$ generated in S126 in a ServerKeyExchange. Next, the communication unit 212 transmits the ServerKeyExchange{$R_{S1}$} to the client device 100.

(S128) The verification processing unit 215 generates a server-generated verifier (verifier verify_data) by using the master private information $M_S$. The communication unit 212 includes the server-generated verifier in a Finished(S). Next, the communication unit 212 transmits the Finished(S) to the client device 100.

(S129) The communication unit 113 receives the ServerKeyExchange{$R_{S1}$} and the Finished(S).

The shared-key generation unit 114 generates a shared key $Z_C$ by using the server-generated key material $R_{S1}$ extracted from the ServerKeyExchange, the random number $r_{C1}$, the private key $S_C$ corresponding to the identifier $ID_C$, and the public parameter e. In this case, the shared key $Z_C$ is given by the following expression (17). Next, in accordance with the TLS specification (see the above expressions (9) to (12)), the shared-key generation unit 114 generates master private information $M_C$ by using the shared key $Z_C$ as pre-master private information.

$$Z_C=e(R_{S1},r_{C1}S_C) \qquad (17)$$

(S130) The verification processing unit 115 generates a client-generated verifier (verifier verify_data) by using the master private information $M_C$. In addition, the verification processing unit 115 determines whether the server-generated verifier extracted from the Finished(S) and the client-generated verifier match. If the server-generated verifier and the client-generated verifier match, success of the authentication is determined. In contrast, if the server-generated verifier and the client-generated verifier do not match, failure of the authentication is determined.

(S131) The communication unit 113 includes the client-generated verifier in a Finished(C). Next, the communication unit 113 transmits the Finished(C) to the server device 200.

(S132) The verification processing unit 215 determines whether the client-generated verifier extracted from the Finished(C) and the server-generated verifier generated in S128 match. If the server-generated verifier and the client-generated verifier match, success of the authentication is determined. In contrast, if the server-generated verifier and the client-generated verifier do not match, failure of the authentication is determined.

After completion of the processing in S132, the series of processing illustrated in FIG. 7 is ended. As illustrated in the sequence in FIG. 7, five flights (Com#1 to Com#5) are performed in a handshake.

SEQUENCE: COMPARATIVE EXAMPLE

Figure 8:
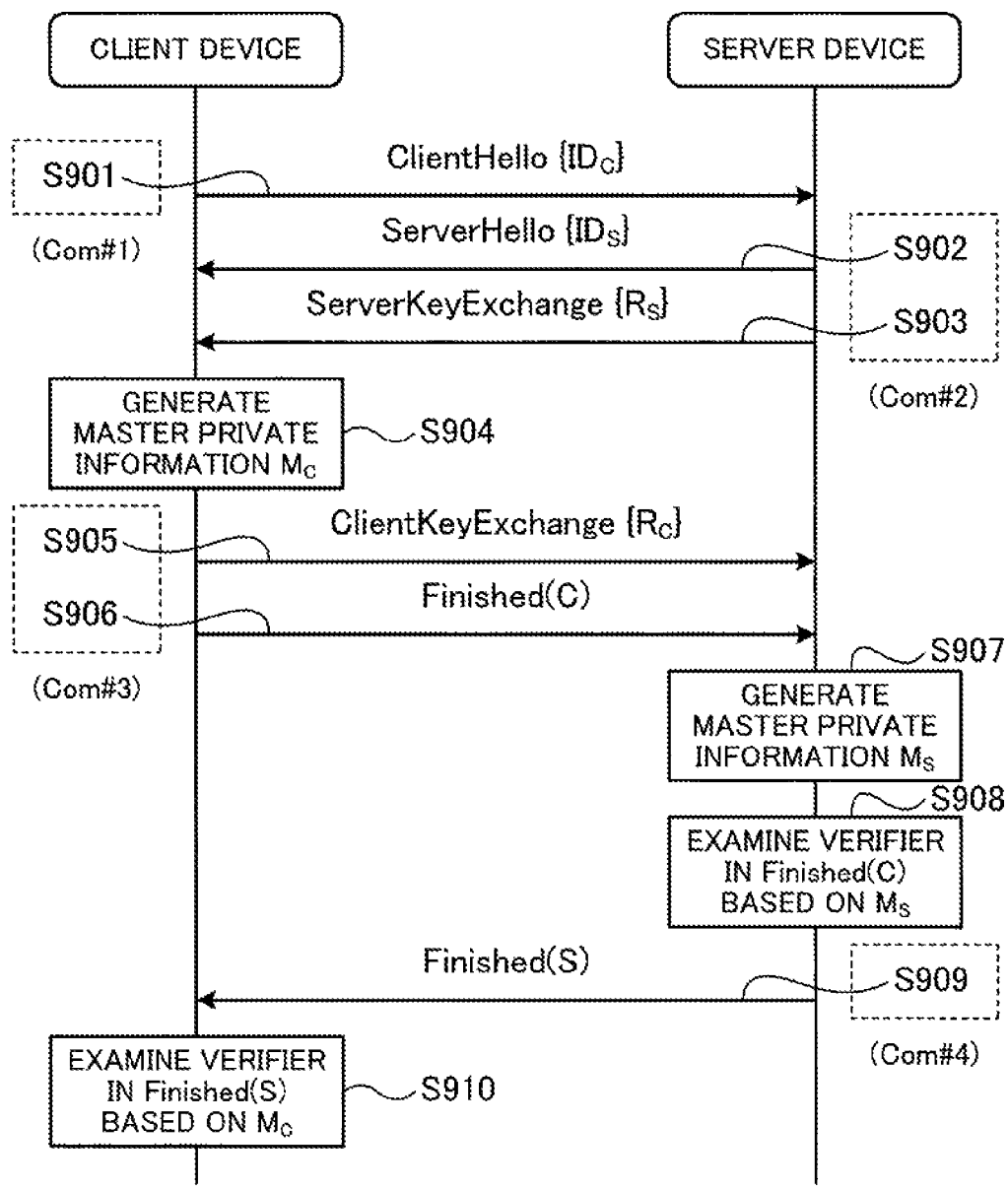
FIG. 8 is a sequence diagram illustrating a flow of authentication processing (a comparative example: without an error) according to a handshake of TLS.

Next, a flow of authentication processing (without an error) according to a comparative example performed when a TLS handshake is performed will be described with reference to FIG. 8. FIG. 8 is a sequence diagram illustrating a flow of authentication processing (without an error) according to a comparative example performed when a TLS handshake is performed.

(S901) A client device selects an identifier $ID_C$ as client identification information, includes the identifier $ID_C$ in a ClientHello, and transmits the ClientHello to a server device. The ClientHello$\{ID_C\}$ is transmitted as a single flight (Com#1).

(S902) When receiving the ClientHello$\{ID_C\}$, the server device selects an identifier $ID_S$ as server identification information used in the authentication processing, includes the identifier $ID_S$ in a ServerHello, and transmits the ServerHello to the client device.

(S903) The server device generates a server-generated key material $R_S$, includes the server-generated key material $R_S$ in a ServerKeyExchange, and transmits the ServerKeyExchange to the client device.

The ServerHello$\{ID_S\}$ and the ServerKeyExchange$\{R_S\}$ are transmitted as a single flight (Com#2).

(S904) When receiving the ServerHello$\{ID_S\}$ and the ServerKeyExchange$\{R_S\}$, the client device generates master private information $M_C$.

(S905) The client device generates a client-generated key material $R_C$, includes the client-generated key material $R_C$ in a ClientKeyExchange, and transmits the ClientKeyExchange to the server device.

(S906) The client device generates a client-generated verifier by using the master private information $M_C$, includes the client-generated verifier in a Finished(C), and transmits the Finished(C) to the server device.

The ClientKeyExchange$\{R_C\}$ and the Finished(C) are transmitted as a single flight (Com#3).

(S907) When receiving the ClientKeyExchange$\{R_C\}$ and the Finished(C), the server device generates master private information $M_S$.

(S908) The server device generates a server-generated verifier by using the master private information $M_S$ and examines the client-generated verifier included in the Finished(C) by using the server-generated verifier.

(S909) The server device includes the server-generated verifier in a Finished(S) and transmits the Finished(S) to the client device. The Finished(S) is transmitted as a single flight (Com#4).

(S910) When receiving the Finished(S), the client device examines the server-generated verifier included in the Finished(S) by using the client-generated verifier.

As described above, in this authentication processing (without an error) according to the comparative example performed when a TLS handshake is performed, four flights are performed. In contrast, in the authentication processing illustrated in FIG. 6, three flights are performed. Namely, if the method illustrated in FIG. 6 is used, the number of flights is reduced, and the communication load caused when a handshake is performed is reduced.

(State Transition: Client Device 100)

Figure 9:
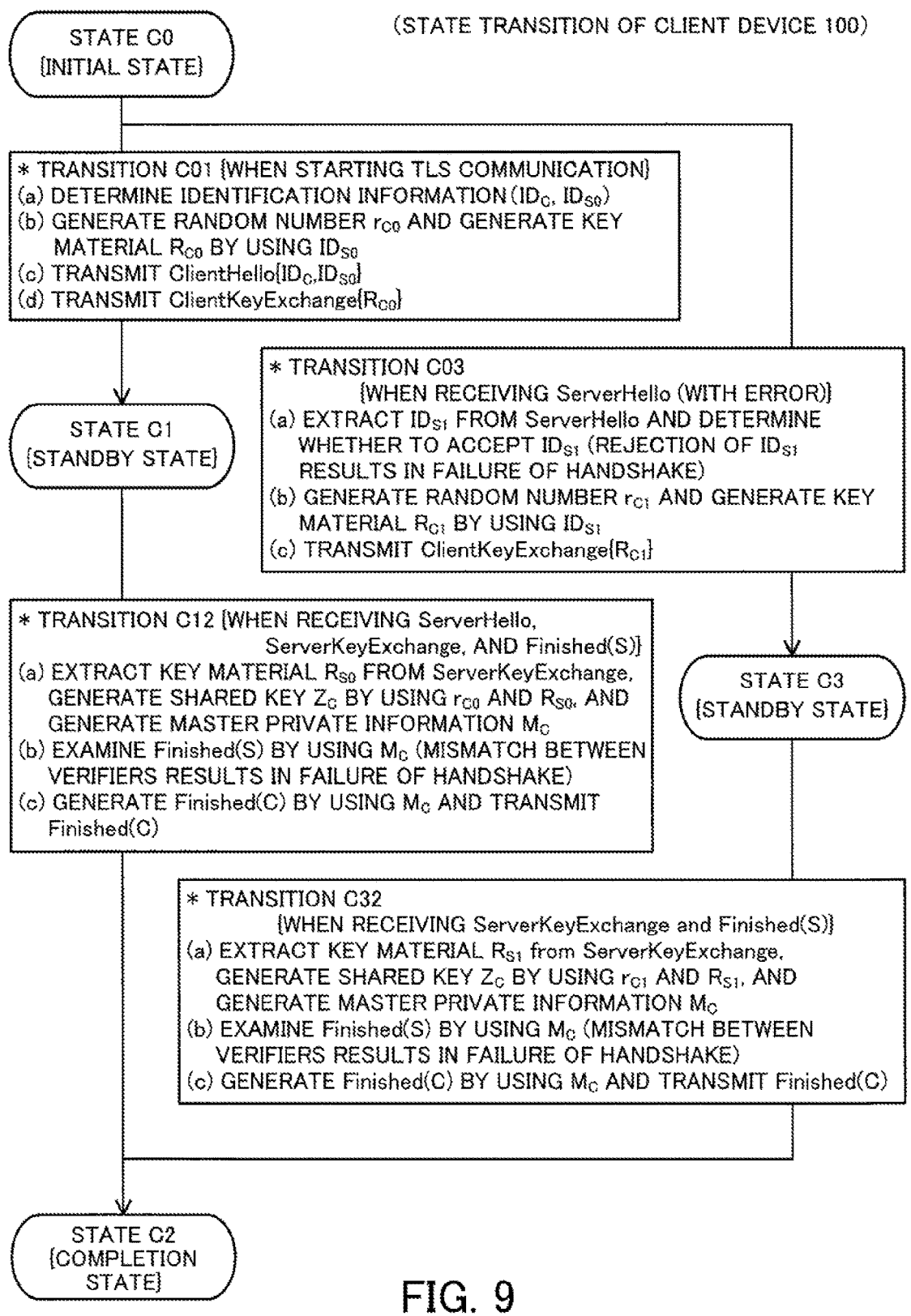
FIG. 9 illustrates a state transition of the client device according to the second embodiment.

Next, a state transition of the client device 100 will be described with reference to FIG. 9. FIG. 9 illustrates a state transition of the client device 100 according to the second embodiment.

(States C0 to C3)

As illustrated in FIGS. 6 and 7, the client device 100 receives certain messages from the server device 200 and performs processing in response to these received messages. As illustrated in FIG. 9, the client device 100 is set in an initial state (state C0) before a handshake is performed, in a standby state (states C1 and C3) in which the client device 100 waits for messages transmitted from the server device 200, and in a completion state (state C2) in which the handshake is completed.

The state of the client device 100 changes when a certain condition is met. In the example in FIG. 9, the transition from the state C0 to the state C1 is expressed as a transition C01, and the transition from the state C0 to the state C3 is expressed as a transition C03. In addition, the transition from the state C1 to the state C2 is expressed as a transition C12, and the transition from the state C3 to the state C2 is expressed as a transition C32. The conditions regarding the respective transitions C01, C03, C12, and C32 and the processing contents performed when these respective conditions are met are set as follows.

(Transition C01)

The condition regarding the transition C01 is met when the client device 100 in the state C0 starts a TLS communication.

In the transition C01, the communication unit 113 determines the client identification information 111a (an identifier $ID_C$) and the server identification information 111b (an identifier $ID_{S0}$) used in the present authentication processing.

The key material generation unit 112 generates a random number $r_{C0}$. In addition, the key material generation unit 112 generates a public key $P_{S0}$ ($P_{S0}=H(ID_{S0})P+P_0$) of the server device 200 by using the public parameters H, P, and $P_0$ and the identifier $ID_{S0}$. Next, the key material generation unit 112 generates a client-generated key material $R_{C0}$ ($R_{C0}=r_{C0}P_{S0}$) by using the random number $r_{C0}$ and the public key $P_{S0}$ of the server device 200.

The communication unit 113 includes the identifiers $ID_C$ and $ID_{S0}$ in a ClientHello. Next, the communication unit 113 transmits the ClientHello$\{ID_C,ID_{S0}\}$ to the server device 200. In addition, the communication unit 113 includes the client-generated key material $R_{C0}$ in a ClientKeyExchange. Next, the communication unit 113 transmits the ClientKeyExchange$\{R_{C0}\}$ to the server device 200.

(Transition C03)

The condition regarding the transition C03 is met when the client device 100 in the state C0 receives a ServerHello (with an error).

When the server device 200 does not accept the identifier $ID_{S0}$ included in the ClientHello$\{ID_C,ID_{S0}\}$ transmitted from the communication unit 113 (see FIG. 7), the server device 200 transmits a ServerHello$\{error,ID_{S1}\}$, for example. When the client device 100 receives a ServerHello including such an error, the transition C03 occurs.

In the transition C03, the communication unit 113 extracts an identifier $ID_{S1}$ from the ServerHello, accepts the identifier $ID_{S1}$, and determines whether to proceed with the authentication processing by using the identifier $ID_{S1}$. If the communication unit 113 does not accept the identifier $ID_{S1}$, failure of the handshake is determined.

If the communication unit 113 accepts the identifier $ID_{S1}$, the key material generation unit 112 generates a random number $r_{C1}$. In addition, the key material generation unit 112 generates a public key $P_{S1}$ ($P_{S1}=H(ID_{S1})P+P_0$) of the server device 200 by using the public parameters H, P, and $P_0$ and the identifier $ID_{S1}$. In addition, the key material generation unit 112 generates a client-generated key material $R_{C1}$ ($R_{C1}=r_{C1}P_{S1}$) by using the random number $r_{C1}$ and the public key $P_{S1}$ of the server device 200.

The communication unit 113 includes the client-generated key material $R_{C1}$ in a ClientKeyExchange. Next, the communication unit 113 transmits the ClientKeyExchange$\{R_{C1}\}$ to the server device 200.

(Transition C12)

The condition regarding the transition C12 is met when the client device 100 in the state C1 receives a ServerHello, a ServerKeyExchange, and a Finished(S).

In the transition C12, the shared-key generation unit 114 extracts a server-generated key material $R_{S0}$ from the ServerKeyExchange and generates a shared key $Z_C$ by using the server-generated key material $R_{S0}$, the random number $r_{C0}$, the private key $S_C$ corresponding to the identifier $ID_C$, and the public parameter e. Next, in accordance with the TLS specification, the shared-key generation unit 114 generates master private information $M_C$ by using the shared key $Z_C$ as pre-master private information.

The verification processing unit 115 generates a client-generated verifier (verifier verify_data) by using the master private information $M_C$. In addition, the verification processing unit 115 determines whether a server-generated verifier extracted from the Finished(S) and the client-generated verifier match. If the server-generated verifier and the client-generated verifier do not match, failure of the handshake is determined.

If the server-generated verifier and the client-generated verifier match, the communication unit 113 includes the client-generated verifier in a Finished(C) and transmits the Finished(C) to the server device 200.

(Transition C32)

The condition regarding the transition C32 is met when the client device 100 in the state C3 receives a ServerKeyExchange and a Finished(S).

In the transition C32, the shared-key generation unit 114 extracts a server-generated key material $R_{S1}$ from the ServerKeyExchange. In addition, the shared-key generation unit 114 generates a shared key $Z_C$ by using the server-generated key material $R_{S1}$, the random number $r_{C1}$, the private key $S_C$ corresponding to the identifier $ID_C$, and the public parameter e. In addition, in accordance with the TLS specification, the shared-key generation unit 114 generates master private information $M_C$ by using the shared key $Z_C$ as pre-master private information.

The verification processing unit 115 generates a client-generated verifier (verifier verify_data) by using the master private information $M_C$. In addition, the verification processing unit 115 determines whether a server-generated verifier extracted from the Finished(S) and the client-generated verifier match.

If the server-generated verifier and the client-generated verifier do not match, failure of the handshake is determined. If the server-generated verifier and the client-generated verifier match, the communication unit 113 includes the client-generated verifier in a Finished(C) and transmits the Finished(C) to the server device 200.

(State Transition: Server Device 200)

Figure 10:
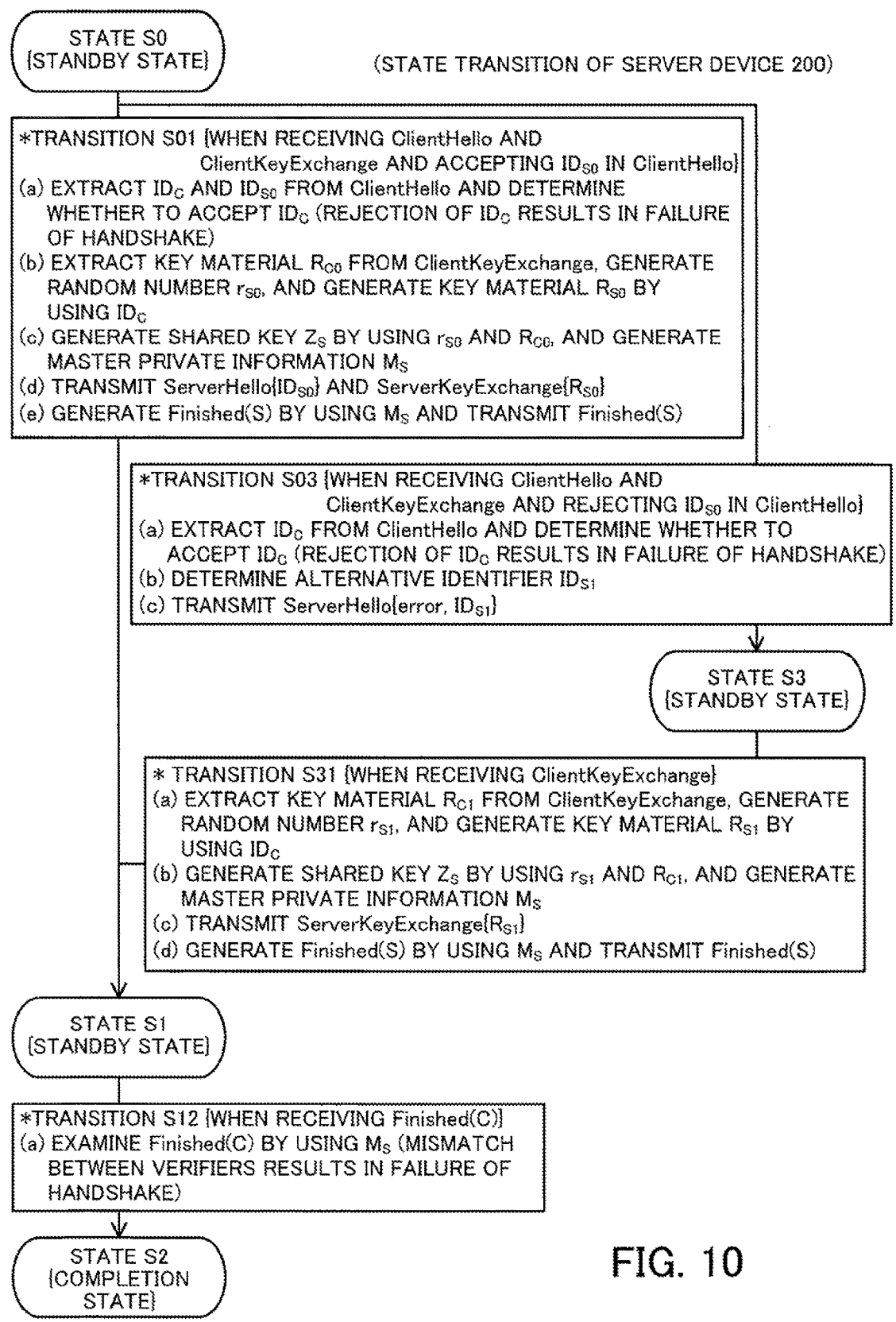
FIG. 10 illustrates a state transition of the server device according to the second embodiment.

Next, a state transition of the server device 200 will be described with reference to FIG. 10. FIG. 10 illustrates a state transition of the server device 200 according to the second embodiment.

(States S0 to S3)

As illustrated in FIGS. 6 and 7, the server device 200 receives certain messages from the client device 100 and performs processing in response to these received messages. As illustrated in FIG. 10, the server device 200 is set in a standby state (states S0, S1, and S3) in which the server device 200 waits for messages transmitted from the client device 100 and a completion state (state S2) in which the handshake is completed.

The state of the server device 200 changes when a certain condition is met. In the example in FIG. 10, the transition from the state S0 to the state S1 is expressed as a transition S01, and the transition from the state S0 to the state S3 is expressed as a transition S03. In addition, the transition from the state S1 to the state S2 is expressed as a transition S12, and the transition from the state S3 to the state S1 is expressed as a transition S31. The conditions regarding the respective transitions S01, S03, S12, and S31 and the processing contents performed when these respective conditions are met are set as follows.

(Transition S01)

The condition regarding the transition S01 is met when the server device 200 in the state S0 receives a ClientHello and a ClientKeyExchange and accepts an identifier $ID_{S0}$ in the ClientHello.

In the transition S01, the communication unit 212 extracts an identifier $ID_C$ from the ClientHello and determines whether to accept the identifier $ID_C$ as the identifier of the client device 100 that wishes to be the communication peer in the present authentication processing.

For example, when a validity period is set to the identifier $ID_C$, unless the validity period is expired, the communication unit 212 accepts the identifier $ID_C$. When the server device 200 holds a list of the identifiers of the client devices authorized as handshake peers, if the identifier $ID_C$ is included in the list, the communication unit 212 accepts the identifier $ID_C$. If the communication unit 212 does not accept the identifier $ID_C$, failure of the handshake is determined.

If the communication unit 212 accepts the identifier $ID_C$, the key material generation unit 213 extracts a client-generated key material $R_{C0}$ from the ClientKeyExchange and generates a random number $r_{S0}$. In addition, the key material generation unit 213 generates a public key $P_C$ ($P_C=H(ID_C)P+P_0$) of the client device 100 by using the public parameters H, P, and $P_0$ and the identifier $ID_C$ extracted from the ClientHello. In addition, the key material generation unit 213 generates a server-generated key material $R_{S0}$ ($R_{S0}=r_{S0}P_C$) by using the random number $r_{S0}$ and the public key $P_C$.

The shared-key generation unit 214 generates a shared key $Z_S$ by using the client-generated key material $R_{C0}$ extracted from the ClientKeyExchange, the random number $r_{S0}$, the private key $S_{S0}$ corresponding to the identifier $ID_{S0}$, and the public parameter e. Next, in accordance with the TLS specification, the shared-key generation unit 214 generates master private information $M_S$ by using the shared key $Z_S$ as pre-master private information.

The communication unit 212 includes the identifier $ID_{S0}$ in a ServerHello. In addition, the communication unit 212 includes the server-generated key material $R_{S0}$ in a ServerKeyExchange. Next, the communication unit 212 transmits the ServerHello$\{ID_{S0}\}$ and the ServerKeyExchange$\{R_{S0}\}$ to the client device 100. The verification processing unit 215 generates a server-generated verifier (verifier verify_data) by using the master private information $M_S$. The communication unit 212 includes the server-generated verifier in a Finished(S) and transmits the Finished(S) to the client device 100.

(Transition S03)

The condition regarding the transition S03 is met when the server device 200 in the state S0 receives a ClientHello and a ClientKeyExchange and does not accept an $ID_{S0}$ in the ClientHello. For example, if the validity period of the identifier $ID_{S0}$ is expired, the server device 200 does not accept the identifier $ID_{S0}$.

In the transition S03, the communication unit 212 extracts an identifier $ID_C$ from the ClientHello and determines whether to accept the identifier $ID_C$ as the identifier of the client device 100 that wishes to be the communication peer in the present authentication processing.

For example, when a validity period is set to the identifier $ID_C$, unless the validity period is expired, the communication unit 212 accepts the identifier $ID_C$. When the server device 200 holds a list of the identifiers of the client devices authorized as handshake peers, if the identifier $ID_C$ is included in the list, the communication unit 212 accepts the identifier $ID_C$. If the communication unit 212 does not accept the identifier $ID_C$, failure of the handshake is determined.

If the communication unit 212 does not accept the identifier $ID_C$, the communication unit 212 determines an alternative identifier $ID_{S1}$ acceptable as the identifier used in the authentication processing. Next, the communication unit 212 includes an error, which is information indicating occurrence of an error, and the identifier $ID_{S1}$ in a ServerHello and transmits the ServerHello$\{error, ID_{S1}\}$ to the client device 100.

(Transition S31)

The condition regarding the transition S31 is met when the server device 200 in the state S3 receives a ClientKeyExchange.

In the transition S31, the key material generation unit 213 extracts a client-generated key material $R_{C1}$ from the ClientKeyExchange and generates a random number $r_{S1}$. In addition, the key material generation unit 213 generates a public key $P_C$ ($P_C = H(ID_C)P + P_0$) of the client device 100 by using the public parameters H, P, and $P_0$ and the identifier $ID_C$ extracted from the ClientHello. Next, the key material generation unit 213 generates a server-generated key material $R_{S1}$ ($R_{S1} = r_{S1}P_C$) by using the random number $r_{S1}$ and the public key $P_C$.

The shared-key generation unit 214 generates a shared key $Z_S$ by using the client-generated key material $R_{C1}$ extracted from the ClientKeyExchange, the random number $r_{S1}$, the private key $S_{S1}$ corresponding to the identifier $ID_{S1}$, and the public parameter e. Next, in accordance with the TLS specification, the shared-key generation unit 214 generates master private information $M_S$ by using the shared key $Z_S$ as pre-master private information.

The communication unit 212 includes the server-generated key material $R_{S1}$ in a ServerKeyExchange and transmits the ServerKeyExchange$\{R_{S1}\}$ to the client device 100. The verification processing unit 215 generates a server-generated verifier (verifier verify_data) by using the master private information $M_S$. The communication unit 212 includes the server-generated verifier in a Finished(S) and transmits the Finished(S) to the client device 100.

(Transition S12)

The condition regarding the transition S12 is met when the server device 200 in the state S1 receives a Finished(C).

The verification processing unit 215 determines whether a client-generated verifier extracted from the Finished(C) and the server-generated verifier match. If the server-generated verifier and the client-generated verifier do not match, failure of the handshake is determined.

A flow of authentication processing performed when the client device 100 and server device 200 perform a handshake has been described.

[2-5. Variation]

Next, a variation according to the second embodiment will be described.

(Sequence: When There is an Error in the Server Identifier)

Figure 11:
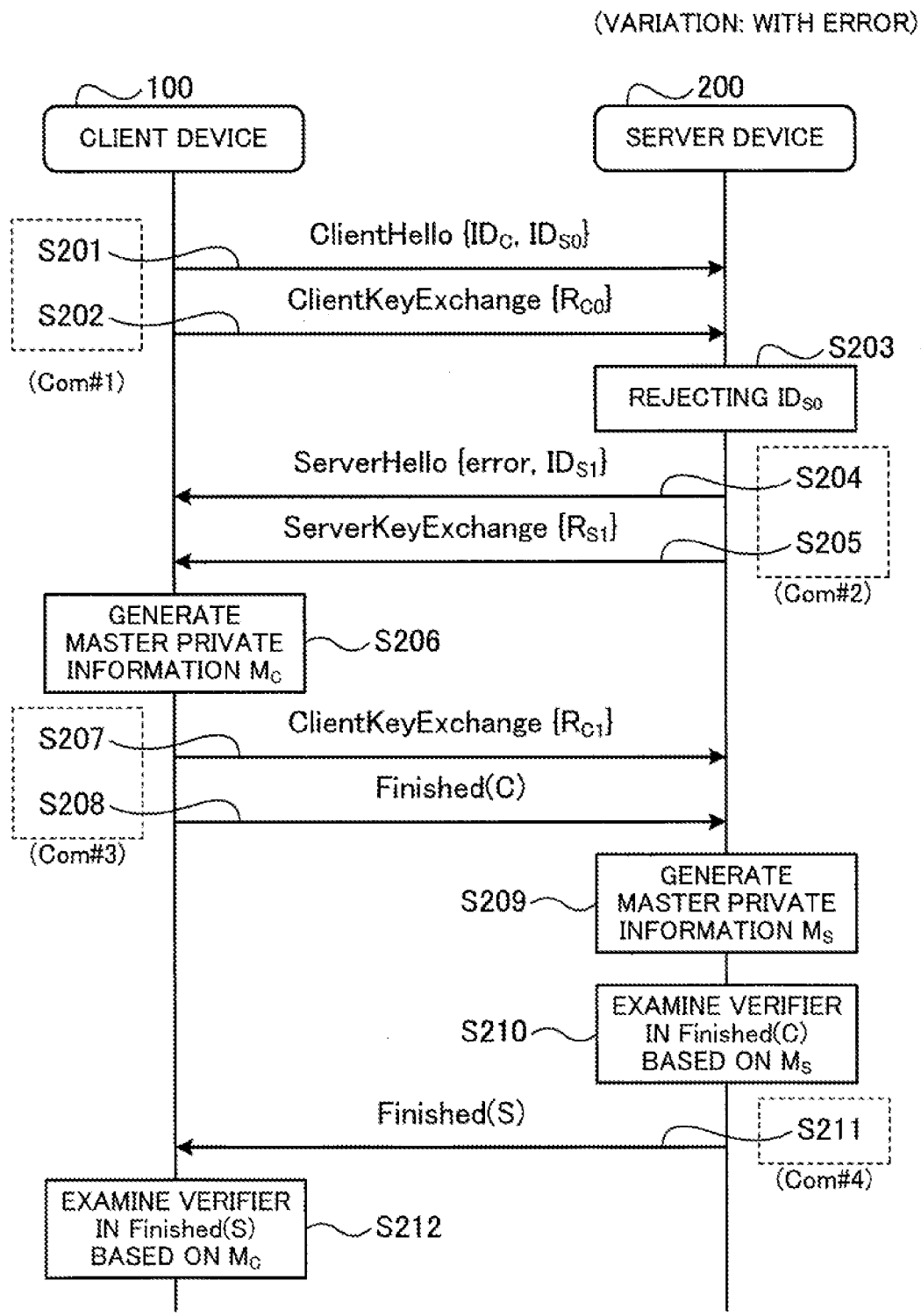
FIG. 11 is a sequence diagram illustrating a flow of authentication processing (with an error) according to a variation of the second embodiment.

A flow of authentication processing (with an error) according to the present variation will be described with reference to FIG. 11. The following authentication processing will be described assuming that the server device 200 does not accept the identifier transmitted from the client device 100 as the server identification information. FIG. 11 is a sequence diagram illustrating a flow of authentication processing (with an error) according to a variation of the second embodiment.

(S201) The communication unit 113 includes the client identification information 111a (an identifier $ID_C$) and the server identification information 111b (an identifier $ID_{S0}$) used in the authentication processing in a ClientHello. The communication unit 113 transmits the ClientHello$\{ID_C, ID_{S0}\}$ to the server device 200.

(S202) The key material generation unit 112 generates a random number $r_{C0}$. In addition, the key material generation unit 112 generates a public key $P_{S0}$ ($P_{S0} = H(ID_{S0})P + P_0$) of the server device 200 by using the public parameters H, P, and $P_0$ and the identifier $ID_{S0}$. Next, the key material generation unit 112 generates a client-generated key material $R_{C0}$ ($R_{C0} = r_{C0}P_{S0}$) by using the random number $r_{C0}$ and the public key $P_{S0}$ of the server device 200.

The communication unit 113 includes the client-generated key material $R_{C0}$ in a ClientKeyExchange. Next, the communication unit 113 transmits the ClientKeyExchange$\{R_n\}$ to the server device 200.

(S203) The communication unit 212 extracts the identifier $ID_{S0}$ from the ClientHello and determines whether to accept the identifier $ID_{S0}$ as the identifier used in the authentication processing. In the example in FIG. 11, the communication unit 212 does not accept the identifier $ID_{S0}$. For example, when a validity period of the identifier $ID_{S0}$ is expired, the communication unit 212 does not accept the identifier $ID_{S0}$.

(S204) the communication unit 212 includes an error, which is information indicating occurrence of an error, and an identifier $ID_{S1}$ as the identifier acceptable in the authentication processing in a ServerHello. Next, the communication unit 212 transmits the ServerHello$\{error, ID_{S1}\}$ to the client device 100.

(S205) The key material generation unit 213 generates a random number $r_{S1}$. In addition, the key material generation unit 213 generates a public key $P_C$ ($P_C = H(ID_C)P + P_0$) of the client device 100 by using the public parameters H, P, and $P_0$ and the identifier $ID_C$ extracted from the ClientHello. In addition, the key material generation unit 213 generates a server-generated key material $R_{S1}$ ($R_{S1} = r_{S1}P_C$) by using the random number $r_{S1}$ and the public key $P_C$.

The communication unit 212 includes the server-generated key material $R_{S1}$ in a ServerKeyExchange. The communication unit 212 transmits the ServerKeyExchange$\{R_{S1}\}$ to the client device 100.

(S206) When receiving the ServerHello$\{$error,ID$_{S1}\}$ and the ServerKeyExchange$\{R_{S1}\}$, the communication unit 113 determines whether to accept the identifier ID$_{S1}$ and proceed with the authentication processing by using the identifier ID$_{S1}$. In the example in FIG. 11, the communication unit 113 accepts identifier ID$_{S1}$.

The key material generation unit 112 generates a random number $r_{C1}$. In addition, the key material generation unit 112 generates a public key $P_{S1}$ ($P_{S1}$=H(IDS$_1$)P+P$_0$) of the server device 200 by using the public parameters H, P, and P$_0$ and the identifier ID$_{S1}$. In addition, the key material generation unit 112 generates a client-generated key material $R_{C1}$ ($R_{C1}$=$r_{C1}P_{S1}$) by using the random number $r_{C1}$ and the public key $P_{S1}$ of the server device 200.

The shared-key generation unit 114 generates a shared key $Z_C$ by using the server-generated key material $R_{S1}$ extracted from the ServerKeyExchange, the random number $r_{C1}$, the private key $S_C$ corresponding to the identifier ID$_C$, and the public parameter e. Next, in accordance with the TLS specification, the shared-key generation unit 114 generates master private information $M_C$ by using the shared key $Z_C$ as pre-master private information.

(S207) The communication unit 113 includes the client-generated key material $R_{C1}$ in a ClientKeyExchange. Next, the communication unit 113 transmits the ClientKeyExchange$\{R_{C1}\}$ to the server device 200.

(S208) The verification processing unit 115 generates client-generated verifier (verifier verify_data) by using the master private information $M_C$. The communication unit 113 includes the client-generated verifier in a Finished(C). Next, the communication unit 113 transmits the Finished(C) to the server device 200.

(S209) The communication unit 212 receives the ClientKeyExchange$\{R_{C1}\}$ and the Finished(C). The shared-key generation unit 214 generates a shared key $Z_S$ by using the client-generated key material $R_{C1}$ extracted from the ClientKeyExchange, the random number $r_{S1}$, the private key $S_{S1}$ corresponding to the identifier ID$_{S1}$, and the public parameter e. Next, in accordance with the TLS specification, the shared-key generation unit 214 generates master private information $M_S$ by using the shared key $Z_S$ as pre-master private information.

(S210) The verification processing unit 215 generates a server-generated verifier (verifier verify_data) by using the master private information $M_S$. The verification processing unit 215 determines whether the client-generated verifier extracted from the Finished(C) and the server-generated verifier match. If the server-generated verifier and the client-generated verifier match, success of the authentication is determined. In contrast, if the server-generated verifier and the client-generated verifier do not match, failure of the authentication is determined.

(S211) The communication unit 212 includes the server-generated verifier in a Finished(S). Next, the communication unit 212 transmits the Finished(S) to the client device 100.

(S212) The communication unit 113 receives the Finished (S). The verification processing unit 115 determines whether the server-generated verifier extracted from the Finished(S) and the client-generated verifier match. If the server-generated verifier and the client-generated verifier match, success of the authentication is determined. In contrast, if the server-generated verifier and the client-generated verifier do not match, failure of the authentication is determined.

After the processing in S212 is completed, the series of processing illustrated in FIG. 11 is ended. In the sequence in FIG. 11, four flights (Com#1 to Com#4) are performed when the handshake is performed. Namely, according to the present variation, fewer flights are needed, compared with the sequence in FIG. 7.

(State Transition: Client Device 100)

Figure 12:
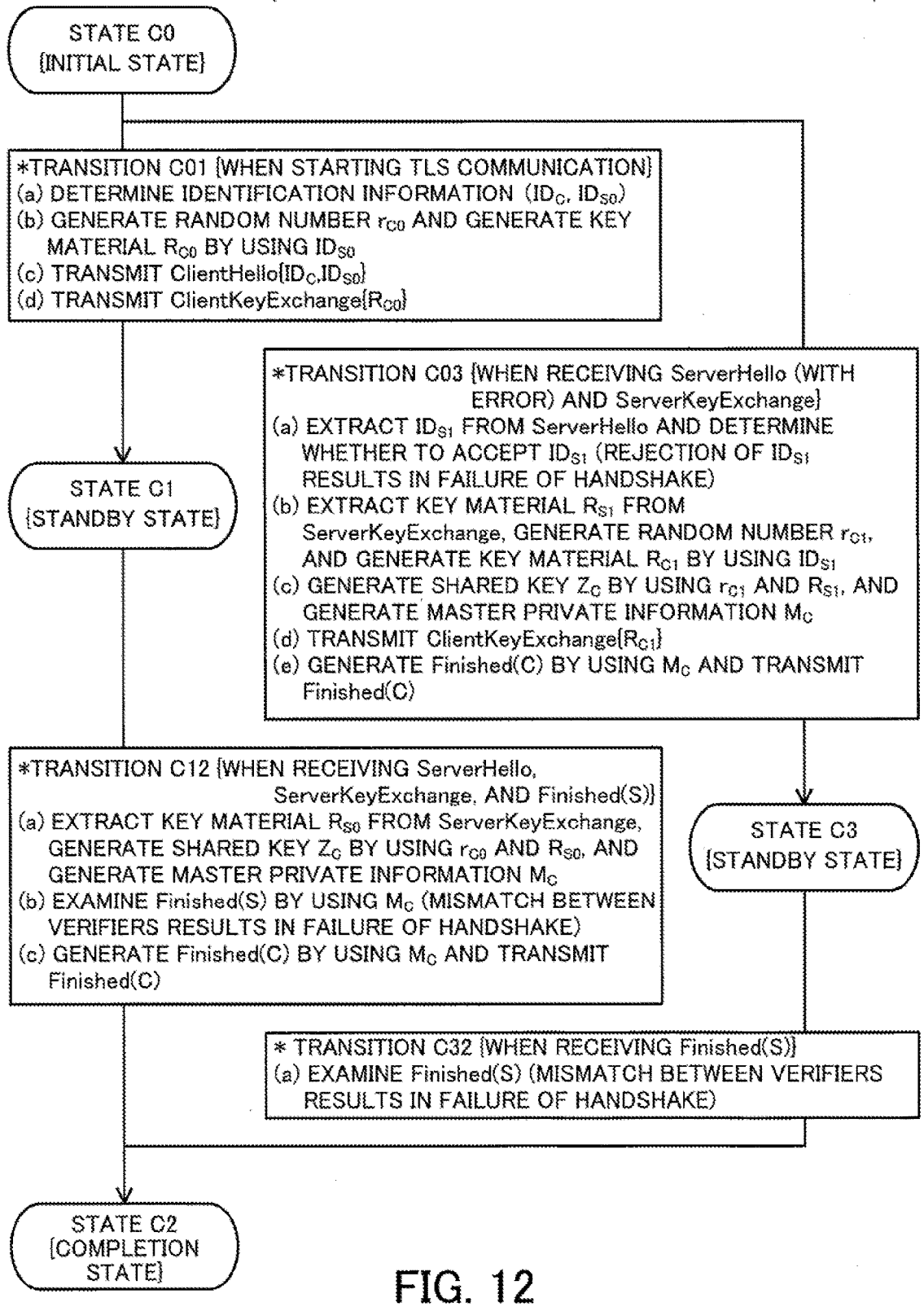
FIG. 12 illustrates a state transition of the client device according to the variation of the second embodiment.

Next, a state transition of the client device 100 according to the present variation will be described with reference to FIG. 12. FIG. 12 illustrates a state transition of the client device 100 according to the variation of the second embodiment.

(Transition C01)

The condition regarding the transition C01 is met when the client device 100 in the state C0 starts a TLS communication.

In the transition C01, the communication unit 113 determines the client identification information 111a (an identifier ID$_C$) and the server identification information 111b (an identifier ID$_{S0}$) used in the present authentication processing.

The key material generation unit 112 generates a random number $r_{C0}$. In addition, the key material generation unit 112 generates a public key $P_{S0}$ ($P_{S0}$=H(ID$_{S0}$)P+P$_0$) of the server device 200 by using the public parameters H, P, and P$_0$ and the identifier ID$_{S0}$. Next, the key material generation unit 112 generates a client-generated key material $R_{C0}$ ($R_{C0}$=$r_{C0}P_{S0}$) by using the random number $r_{C0}$ and the public key $P_{S0}$ of the server device 200.

The communication unit 113 includes the identifiers ID$_C$ and ID$_{S0}$ in a ClientHello. Next, the communication unit 113 transmits the ClientHello$\{$ID$_C$,ID$_{S0}\}$ to the server device 200. In addition, the communication unit 113 includes the client-generated key material $R_{C0}$ in a ClientKeyExchange. Next, the communication unit 113 transmits the ClientKeyExchange$\{R_{C0}\}$ to the server device 200.

(Transition C03)

The condition regarding the transition C03 is met when the client device 100 in the state C0 receives a ServerHello (with an error) and a ServerKeyExchange.

In the transition C03, the communication unit 113 extracts an identifier ID$_{S1}$ from the ServerHello and determines whether to accept the identifier ID$_{S1}$ and proceed with the authentication processing by using the identifier ID$_{S1}$. If the communication unit 113 does not accept the identifier ID$_{S1}$, failure of the handshake is determined.

If the communication unit 113 accepts the identifier ID$_{S1}$, the key material generation unit 112 generates a random number $r_{C1}$. In addition, the key material generation unit 112 generates a public key $P_{S1}$ ($P_{S1}$=H(ID$_{S1}$)P+P$_0$) of the server device 200 by using the public parameters H, P, and P$_0$ and the identifier ID$_{S1}$. In addition, the key material generation unit 112 generates a client-generated key material $R_{C1}$ ($R_{C1}$=$r_{C1}P_{S1}$) by using the random number $r_{C1}$ and the public key $P_{S1}$ of the server device 200.

The shared-key generation unit 114 extracts a server-generated key material $R_{S1}$ from the ServerKeyExchange. In addition, the shared-key generation unit 114 generates a shared key $Z_C$ by using the server-generated key material $R_{S1}$, the random number $r_{C1}$, the private key $S_C$ corresponding to the identifier ID$_C$, and the public parameter e. Next, in accordance with the TLS specification, the shared-key generation unit 114 generates master private information $M_C$ by using the shared key $Z_C$ as pre-master private information.

The communication unit 113 includes the client-generated key material $R_{C1}$ in a ClientKeyExchange and transmits the ClientKeyExchange$\{R_{C1}\}$ to the server device 200. In addition, the communication unit 113 includes a client-generated verifier in a Finished(C) and transmits the Finished(C) to the server device 200.

(Transition C12)

The condition regarding the transition C12 is met when the client device 100 in the state C1 receives a ServerHello, a ServerKeyExchange, and a Finished(S).

In the transition C12, the shared-key generation unit 114 extracts a server-generated key material $R_{S0}$ from the ServerKeyExchange and generates a shared key $Z_C$ by using the server-generated key material $R_{S0}$, the random number $r_{C0}$, the private key $S_C$ corresponding to the identifier $ID_C$, and the public parameter e. Next, in accordance with the TLS specification, the shared-key generation unit 114 generates master private information $M_C$ by using the shared key $Z_C$ as pre-master private information.

The verification processing unit 115 generates a client-generated verifier (verifier verify_data) by using the master private information $M_C$. In addition, the verification processing unit 115 determines whether a server-generated verifier extracted from the Finished(S) and the client-generated verifier match. If the server-generated verifier and the client-generated verifier do not match, failure of the handshake is determined.

If the server-generated verifier and the client-generated verifier match, the communication unit 113 includes the client-generated verifier in a Finished(C) and transmits the Finished(C) to the server device 200.

(Transition C32)

The condition regarding the transition C32 is met when the client device 100 in the state C3 receives a Finished(S).

The verification processing unit 115 determines whether a server-generated verifier extracted from the Finished(S) and the client-generated verifier match. If the server-generated verifier and the client-generated verifier do not match, failure of the handshake is determined.

(State Transition: Server Device 200)

Figure 13:
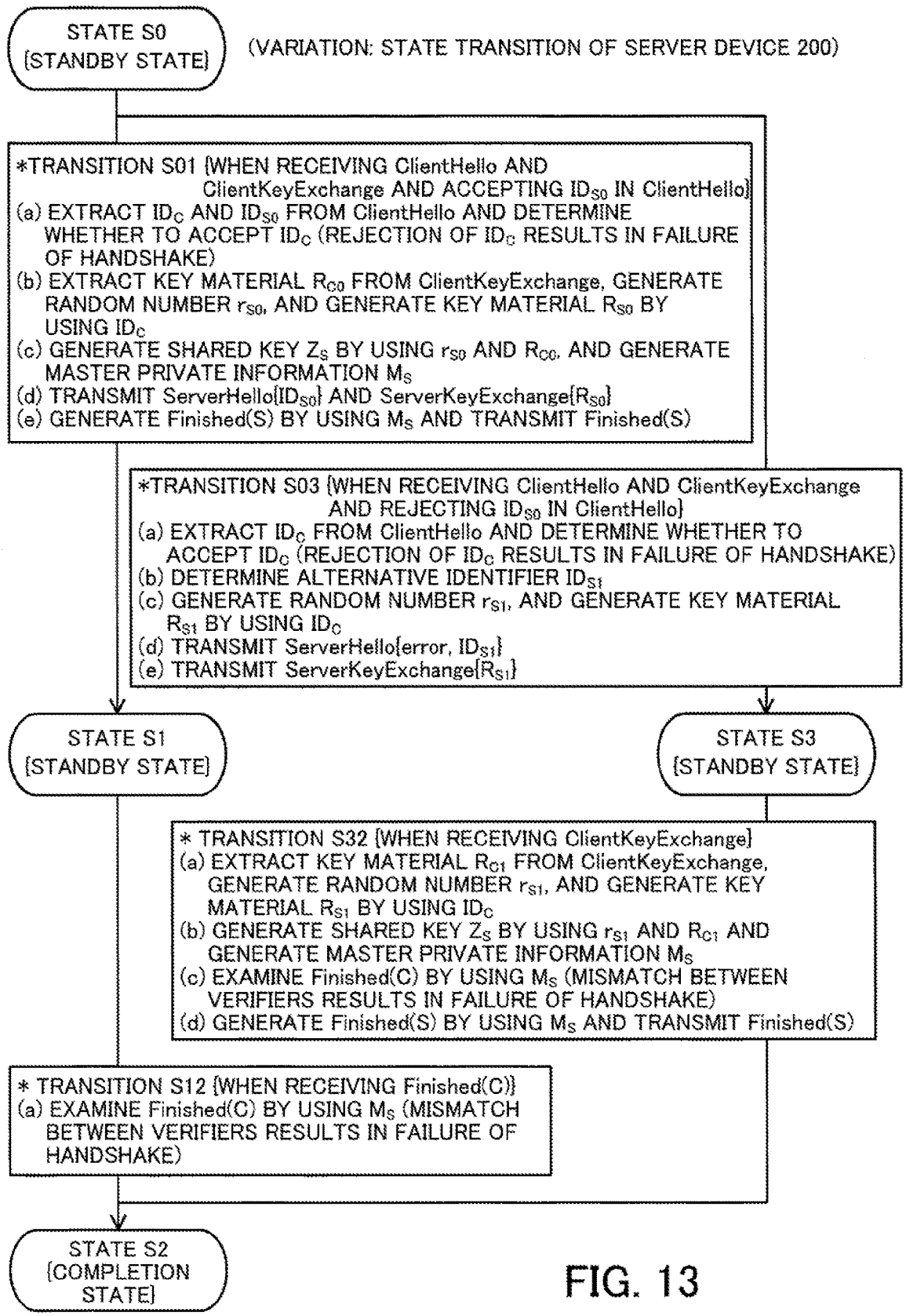
FIG. 13 illustrates a state transition of the server device according to the variation of the second embodiment.

Next, a state transition of the server device 200 according to the present variation will be described with reference to FIG. 13. FIG. 13 illustrates a state transition of the server device 200 according to a variation of the second embodiment.

(Transition S01)

The condition regarding the transition S01 is met when the server device 200 in the state S0 receives a ClientHello and a ClientKeyExchange and accepts an $ID_{S0}$ in the ClientHello.

In the transition S01, the communication unit 212 extracts an identifier $ID_C$ from the ClientHello and determines whether to accept the identifier $ID_C$ as the identifier of the client device 100 that wishes to be the communication peer in the authentication processing.

For example, when a validity period is set to the identifier $ID_C$, unless the validity period is expired, the communication unit 212 accepts the identifier $ID_C$. When the server device 200 holds a list of the identifiers of the client devices authorized as handshake peers, if the identifier $ID_C$ is included in the list, the communication unit 212 accepts the identifier $ID_C$. If the communication unit 212 does not accept the identifier $ID_C$, failure of the handshake is determined.

If the communication unit 212 accepts the identifier $ID_C$, the key material generation unit 213 extracts a client-generated key material $R_{C0}$ from the ClientKeyExchange and generates a random number $r_{S0}$. In addition, the key material generation unit 213 generates a public key $P_C$ ($P_C=H(ID_C)P+P_0$) of the client device 100 by using the public parameters H, P, and $P_0$ and the identifier $ID_C$ extracted from the ClientHello. In addition, the key material generation unit 213 generates a server-generated key material $R_{S0}$ ($R_{S0}=r_{S0}P_C$) by using the random number $r_{S0}$ and the public key $P_C$.

The shared-key generation unit 214 generates a shared key $Z_S$ by using the client-generated key material $R_{S0}$ extracted from the ClientKeyExchange, the random number $r_{S0}$, the private key $S_{S0}$ corresponding to an identifier $ID_{S0}$, and the public parameter e. Next, in accordance with the TLS specification, the shared-key generation unit 214 generates master private information $M_S$ by using the shared key $Z_S$ as pre-master private information.

The communication unit 212 includes the identifier $ID_{S0}$ in a ServerHello. In addition, the communication unit 212 includes the server-generated key material $R_{S0}$ in a ServerKeyExchange. Next, the communication unit 212 transmits the ServerHello$\{ID_{S0}\}$ and the ServerKeyExchange$\{R_{S0}\}$ to the client device 100. The verification processing unit 215 generates a server-generated verifier (verifier verify_data) by using the master private information $M_S$. The communication unit 212 includes the server-generated verifier in a Finished(S) and transmits the Finished(S) to the client device 100.

(Transition S03)

The condition regarding the transition S03 is met when the server device 200 in the state S0 receives a ClientHello and a ClientKeyExchange and does not accept an $ID_{S0}$ in the ClientHello. For example, if the validity period of the identifier $ID_{S0}$ is expired, the server device 200 does not accept the identifier $ID_{S0}$.

In the transition S03, the communication unit 212 extracts an identifier $ID_C$ from the ClientHello and determines whether to accept the identifier $ID_C$ as the identifier of the client device 100 that wishes to be the communication peer in the authentication processing.

For example, when a validity period is set to the identifier $ID_C$, unless the validity period is expired, the communication unit 212 accepts the identifier $ID_C$. When the server device 200 holds a list of the identifiers of the client devices authorized as handshake peers, if the identifier $ID_C$ is included in the list, the communication unit 212 accepts the identifier $ID_C$. If the communication unit 212 does not accept the identifier $ID_C$, failure of the handshake is determined.

If the communication unit 212 does not accept the identifier $ID_C$, the communication unit 212 determines an alternative identifier $ID_{S1}$ acceptable as the identifier used in the authentication. The key material generation unit 213 extracts a client-generated key material $R_{C1}$ from the ClientKeyExchange and generates a random number $r_{S1}$. In addition, the key material generation unit 213 generates a public key $P_C$ ($P_C=H(ID_C)P+P_0$) of the client device 100 by using the public parameters H, P, and $P_0$ and the identifier $ID_C$ extracted from the ClientHello. Next, the key material generation unit 213 generates a server-generated key material $R_{S1}$ ($R_{S1}=r_{S1}P_C$) by using the random number $r_{S1}$ and the public key $P_C$.

The communication unit 212 includes an error, which is information indicating occurrence of an error, and the identifier $ID_{S1}$ in a ServerHello and transmits the ServerHello$\{error,ID_{S1}\}$ to the client device 100. In addition, the communication unit 212 includes the server-generated key material $R_{S1}$ in a ServerKeyExchange and transmits the ServerKeyExchange$\{R_{S1}\}$ to the client device 100.

(Transition S32)

The condition regarding the transition S32 is met when the server device 200 in the state S3 receives a ClientKeyExchange.

In the transition S32, the key material generation unit 213 extracts a client-generated key material $R_{C1}$ from the ClientKeyExchange and generates a random number $r_{S1}$. In addition, the key material generation unit 213 generates a public key $P_C$ ($P_C=H(ID_C)P+P_0$) of the client device 100 by using the public parameters H, P, and $P_0$ and the identifier $ID_C$ extracted from the ClientHello. In addition, the key material generation unit 213 generates a server-generated key material $R_{S1}$ ($R_{S1}=r_{S1}P_C$) by using the random number $r_{S1}$ and the public key $P_C$.

The shared-key generation unit 214 generates a shared key $Z_S$ by using the client-generated key material $R_{C1}$ extracted from the ClientKeyExchange, the random number $r_{S1}$, the private key $S_{S1}$ corresponding to the identifier $ID_{S1}$, and the public parameter e. Next, in accordance with the TLS specification, the shared-key generation unit 214 generates master private information $M_S$ by using the shared key $Z_S$ as pre-master private information.

The verification processing unit 215 generates a server-generated verifier (verifier verify_data) by using the master private information $M_S$. In addition, the verification processing unit 215 determines whether a client-generated verifier extracted from the Finished(C) and the server-generated verifier match. If the server-generated verifier and the client-generated verifier do not match, failure of the handshake is determined. If the server-generated verifier and the client-generated verifier match, the communication unit 212 includes the server-generated verifier in a Finished(S) and transmits the Finished(S) to the client device 100.

(Transition S12)

The condition regarding the transition S12 is met when the server device 200 in the state S1 receives a Finished(C).

The verification processing unit 215 determines whether a client-generated verifier extracted from the Finished(C) and the server-generated verifier match. If the server-generated verifier and the client-generated verifier do not match, failure of the handshake is determined.

The second embodiment has thus been described.

According to one aspect, the authentication time is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mutual authentication method executed by a first information processing apparatus and a second information processing apparatus, the mutual authentication method comprising:

generating, by the first information processing apparatus, first encrypted data by encrypting a first random number by using a second public key that corresponds to second identification information regarding the second information processing apparatus;

transmitting, by the first information processing apparatus, first identification information regarding the first information processing apparatus, the second identification information, and the first encrypted data to the second information processing apparatus;

determining, by the second information processing apparatus, whether to accept the second identification information after the second identification information and the first encrypted data are transmitted;

generating, by the first information processing apparatus, when the second information processing apparatus does not accept the second identification information, other first encrypted data by encrypting the first random number or another first random number by using another second public key corresponding to other second identification information regarding the second information processing apparatus, and transmitting said other first encrypted data to the second information processing apparatus, wherein said another first random number corresponds to other first identification information regarding the first information processing apparatus;

generating, by the second information processing apparatus, second encrypted data by encrypting a second random number by using a first public key that corresponds to the first identification information;

generating, by the second information processing apparatus, a second shared-key candidate, based on the second random number, the first encrypted data, and a second private key that corresponds to the second public key when the second information processing apparatus accepts the second identification information, or based on the second random number, said other first encrypted data, and another second private key corresponding to said another second public key when the second information processing apparatus does not accept the second identification information;

generating, by the second information processing apparatus, second verification data by using the second shared-key candidate;

transmitting, by the second information processing apparatus, the second encrypted data and the second verification data to the first information processing apparatus;

generating, by the first information processing apparatus, a first shared-key candidate, based on the first random number or said another first random number, the second encrypted data, a first private key that corresponds to the first public key;

generating, by the first information processing apparatus, first verification data by using the first shared-key candidate;

examining, by the first information processing apparatus, the second verification data by using the first shared-key candidate;

transmitting, by the first information processing apparatus, the first verification data to the second information processing apparatus; and examining, by the second information processing apparatus, the first verification data by using the second shared-key candidate.

2. The mutual authentication method according to claim 1, wherein, when the second information processing apparatus does not accept the second identification information, the second information processing apparatus transmits the second encrypted data before receiving said other first encrypted data and transmits the second verification data after receiving said other first encrypted data.

3. An authentication apparatus comprising:

a transceiver configured to perform a procedure including:
- transmitting first identification information regarding the authentication apparatus, second identification information regarding another authentication apparatus, and first encrypted data to said another authentication apparatus,
- receiving second encrypted data and second verification data from said another authentication apparatus after transmitting the first encrypted data,
- receiving error information indicating that said another authentication apparatus does not accept the second identification information, after transmitting the second identification information and the first encrypted data,
- transmitting other first encrypted data to said another authentication apparatus after receiving the error information, and
- transmitting first verification data to said another authentication apparatus after receiving the second verification data; and a hardware processor configured to perform a procedure including:
- generating the first encrypted data by encrypting a first random number by using a public key that corresponds to the second identification information,
- generating, when the error information is received, said other first encrypted data by encrypting the first random number or another first random number by using another public key that corresponds to other second identification information regarding said another authentication apparatus, wherein said another first random number corresponds to other first identification information regarding the authentication apparatus,
- generating a first shared-key candidate, based on the first random number or said another first random number, the second encrypted data, and a first private key that corresponds to the first identification information,
- examining the second verification data by using the first shared-key candidate, the second verification data having been generated by said another authentication apparatus by using a second shared-key candidate generated based on a second random number, the first encrypted data or said other first encrypted data, and a second private key that corresponds to the public key or said another public key, and
- generating the first verification data by using the first shared-key candidate.

4. A non-transitory computer-readable storage medium storing an authentication program that causes a computer to perform a procedure comprising:
- generating first encrypted data by encrypting a first random number by using a public key that corresponds to second identification information regarding another computer;
- generating, when error information indicating that said another computer does not accept the second identification information is received from said another computer after transmitting first identification information regarding the computer and the second identification information to said another computer, other first encrypted data by encrypting the first random number or another first random number by using another public key corresponding to other second identification information regarding said another computer, wherein said another first random number corresponds to other first identification information regarding the computer;
- generating, after transmitting the first encrypted data or said other first encrypted data to said another computer, a first shared-key candidate, based on second encrypted data received from said another computer, the first random number or said another first random number, and a first private key that corresponds to the first identification information;
- examining second verification data received from said another computer by using the first shared-key candidate, the second verification data having been generated by said another computer by using a second shared-key candidate, the second shared-key candidate generated based on a second random number, the first encrypted data or said other first encrypted data, and a second private key corresponding to the public key or said another public key; and
- generating first verification data to be transmitted to said another computer after receiving the second verification data, by using the first shared-key candidate.

* * * * *